United States Patent
Yoshida et al.

(10) Patent No.: US 9,621,433 B2
(45) Date of Patent: Apr. 11, 2017

(54) CONTROL METHOD USED IN A REMOTE CONTROL SYSTEM

(71) Applicant: Panasonic Intellectual Property Corporation of America, Torrance, CA (US)

(72) Inventors: Chikara Yoshida, Kanagawa (JP); Kazushige Yamada, Osaka (JP); Kenji Shimizu, Kanagawa (JP); Masaki Takahashi, Osaka (JP); Yuri Nishikawa, Osaka (JP); Masayuki Kozuka, Osaka (JP); Toshihisa Nakano, Osaka (JP); Tsutomu Sekibe, Osaka (JP); Motoji Ohmori, Osaka (JP); Hiroyuki Takemura, Osaka (JP); Jun Yamaguchi, Osaka (JP); Takeshi Hosaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 289 days.

(21) Appl. No.: 14/381,416

(22) PCT Filed: Dec. 25, 2013

(86) PCT No.: PCT/JP2013/007587
§ 371 (c)(1),
(2) Date: Aug. 27, 2014

(87) PCT Pub. No.: WO2014/103304
PCT Pub. Date: Jul. 3, 2014

(65) Prior Publication Data
US 2015/0095790 A1    Apr. 2, 2015

Related U.S. Application Data

(60) Provisional application No. 61/746,875, filed on Dec. 28, 2012.

(51) Int. Cl.
G06F 3/048    (2013.01)
H04L 12/24    (2006.01)
(Continued)

(52) U.S. Cl.
CPC ............ *H04L 41/22* (2013.01); *G06F 3/0482* (2013.01); *G06F 3/04847* (2013.01);
(Continued)

(58) Field of Classification Search
CPC ............ H04L 12/2803; H04L 12/2816; H04L 12/2823
(Continued)

(56) References Cited

U.S. PATENT DOCUMENTS 6,680,746 B2    1/2004  Kawai et al.
7,116,357 B1   10/2006  Oya et al.
(Continued)

FOREIGN PATENT DOCUMENTS

JP    8-340528      12/1996
JP    2002-354555   12/2002
(Continued)

OTHER PUBLICATIONS

International Search Report issued Feb. 10, 2014 in corresponding International Application No. PCT/JP2013/007587.

*Primary Examiner* — Andrey Belousov
(74) *Attorney, Agent, or Firm* — Wenderoth, Lind & Ponack, L.L.P.

(57) ABSTRACT

A control method used in a remote control system according to the present disclosure includes: a step of displaying candidates for a target apparatus to be controlled among apparatuses on a user interface region of a display unit of an information terminal; a step of obtaining, via a network, control indexes used to determine a display mode for the user interface region; a step of displaying, on the user (Continued)

interface region, one or more control menus in a display mode determined based on a selected target apparatus and the control indexes; a step of generating a control signal for causing the target apparatus to perform an operation according to control corresponding to a control menu, when the control menu is selected from the one or more displayed control menus; and a step of transmitting the control signal to the target apparatus via the network.

17 Claims, 42 Drawing Sheets

(51) Int. Cl.
    *G08C 17/02*     (2006.01)
    *G06F 3/0482*     (2013.01)
    *G06F 3/0484*     (2013.01)

(52) U.S. Cl.
    CPC ......... *G08C 17/02* (2013.01); *G08C 2201/30* (2013.01); *G08C 2201/50* (2013.01); *G08C 2201/91* (2013.01)

(58) Field of Classification Search
    USPC .................................................. 715/734, 736
    See application file for complete search history.

(56) References Cited

U.S. PATENT DOCUMENTS

| | | | |
|---|---|---|---|
| 7,689,920 B2 * | 3/2010 | Robbin | G07F 17/16 715/716 |
| 2002/0067412 A1 | 6/2002 | Kawai et al. | |
| 2003/0210277 A1 * | 11/2003 | Harada | G06Q 30/02 715/810 |
| 2010/0122215 A1 * | 5/2010 | MacGregor | G06F 3/0482 715/834 |
| 2011/0246950 A1 * | 10/2011 | Luna | G06F 3/04815 715/848 |
| 2012/0154108 A1 | 6/2012 | Sugaya | |
| 2012/0224221 A1 | 9/2012 | Mochizuki et al. | |

FOREIGN PATENT DOCUMENTS

| | | |
|---|---|---|
| JP | 2003-111157 | 4/2003 |
| JP | 2007-201687 | 8/2007 |
| JP | 2008-199293 | 8/2008 |
| JP | 2012-142907 | 7/2012 |
| JP | 2012-181777 | 9/2012 |

* cited by examiner

FIG. 7

| Smartphone ID | Apparatus ID | Position information | | | |
|---|---|---|---|---|---|
| | | Positioning time | Latitude | North latitude, South latitude | Longitude | East longitude, West longitude |
| 1 | 1 | hhmmss | ddmm.mmm | N/S | dddmm.mmm | E/W |

FIG. 8

| Smartphone ID | Holder | Adult |
|---:|---|---:|
| 1 | Father | 1 |
| 2 | Mother | 1 |
| 3 | Child 1 | 0 |
| 4 | Grandfather | 1 |

FIG. 9

| Apparatus ID | Apparatus type | Owner | Current state | Function | Operator | Current position | Control menu candidate | Display |
|---|---|---|---|---|---|---|---|---|
| 1 | Kotatsu | Co-owners | Power ON | Power ON | Adult | In home | Power ON | NG |
|  |  |  |  |  |  |  | Power OFF | OK |
|  |  |  |  |  |  | Outside home | Power ON | NG |
|  |  |  |  |  |  |  | Power OFF | OK |
|  |  |  |  |  | Child | In home | Power ON | NG |
|  |  |  |  |  |  |  | Power OFF | OK |
|  |  |  |  |  |  | Outside home | Power ON | NG |
|  |  |  |  |  |  |  | Power OFF | NG |
| 2 | BD recorder | Co-owners | Power OFF | Power OFF | Adult | In home | Power ON | OK |
|  |  |  |  | Power ON |  |  | Power OFF | NG |
|  |  |  |  | Power OFF |  | Outside home | Power ON | OK |
|  |  |  |  | Reproduction |  |  | Power OFF | NG |
|  |  |  |  | Fast-forward |  |  |  |  |
|  |  |  |  | Recording | Child | In home | Power ON | OK |
|  |  |  |  | Reservation |  |  | Power OFF | NG |
|  |  |  |  | Power ON |  | Outside home | Power ON | OK |
|  |  |  |  | Power OFF |  |  | Power OFF | NG |
| 3 | Portable music player | Private owner | Off line | Reproduction |  |  |  |  |
| 4 |  |  |  |  |  |  |  |  |

FIG. 14

| User ID | Action type | Apparatus ID | Apparatus Type | Owner | State | Required time | Communication means | Privacy invasion degree | Irreversible operation | Operation schedule | Setting value allowable range | Continuous operation allowable time period | Operation cost | User authentication | Start lag | Status obtainment possibility | User position validity | Apparatus position |
|---|---|---|---|---|---|---|---|---|---|---|---|---|---|---|---|---|---|---|
| Toru | Watch TV | 100 | TV | Toru | Waiting | 2 h | Infrared light | Low | no | 13:00 - 14:00 watching reservation 14:00 - 15:00 recording reservation | None | 5 h | 100 yen | Unnecessary | 0 s | Possible | Valid at same position as apparatus position | Living room in home |
| Toru | Watch movie | 130 | Content server | Kyohei | Recording | 2 h | WLAN, External network | Middle | no | 15:00 - 16:00 recording reservation | None | 5 h | 400 yen | Unnecessary | 0 s | Possible | None | Toru's room |
| Toru | Listen to music | 130 | Content server | Kyohei | Recording | 2 h | WLAN, External network | Middle | no | 15:00 - 16:00 recording reservation | None | 5 h | 400 yen | Unnecessary | 0 s | Possible | None | Toru's room |
| Toru | Transfer video to vehicle navigation system | 130 | Content server | Kyohei | Recording | 2 h | 3G, External network | Middle | no | 15:00 - 16:00 recording reservation | None | 5 h | 100 yen | Unnecessary | 0 s | Possible | None | Toru's room |
| Toru | Transfer photograph to SNS | 130 | Content server | Kyohei | Recording | 1 m | WLAN, External network | High | no | 15:00 - 16:00 recording reservation | None | 5 h | 20 yen | Necessary | 0 s | Possible | None | Toru's room |
| Toru | Decrease room temperature | 110 | Air conditioner | Toru | Warming | 0 h | WLAN, Local network | Low | no | None | 15 - 30 | 8 h | 300 yen | Unnecessary | 0 s | Possible | Valid at same position as apparatus position | Toru's room |
| Toru | Power lighting device ON | 140 | Lighting device | Kyohei | OFF | 0 h | NFC | Low | no | None | None | 8 h | 200 yen | Unnecessary | 0 s | Impossible | Valid at same position as apparatus position | Living room in home |
| Toru | Wash clothes | 140 | Washing machine | Naomi | Waiting | 2 h | NFC | Low | yes | None | None | 5 h | 100 yen | Unnecessary | 60 s | Possible | Valid at same position as apparatus position | Lavatory in home |

FIG. 15

| Warning condition | Example |
|---|---|
| With change of setting to exceed "setting value allowable range" | Adjust temperature of air conditioner to exceed setting allowable temperature |
| With operation of corresponding to "irreversible operation" | Delete stored content such as video. Start washing by washing machine. Start cooking rice. |
| With communication of "communication unit" with external network | Listen to streaming video service |
| With operation with high "privacy invasion degree" | Obtain statuses of weight scale, blood sugar monitor, and blood pressure monitor. Operate network camera. Obtain list of recorded content items. |
| Overlapping of "apparatus schedule" and operation instruction | A time of instructing video recording overlaps a reserved recording time. |
| An "apparatus schedule" is close to operation instruction schedule | A washing machine will finish washing soon, although TV watching starts. |
| With operation with "required time" having predetermined value or more | Start washing by washing machine. Start recording by DVR. |
| With operation with high "operation cost" | Setting high temperature of air conditioner |
| With operation that requires "user authentication" | Upload content to SNS service |
| With operation with long "start lag" | Perform polling temporarily stored operation instruction to server every predetermined time period, and operate apparatus |
| With operation in which "status obtainment" is impossible | Operate toggle-type switch of lighting device |
| With operation having "user position validity" | Power TV ON |
| User's position information is obtained from smartphone, and there is a low probability that user will arrive at "apparatus position" in a predetermined time period or that user leaves the position | It takes a time until user comes back home although air conditioner or the like is operated from outside |

FIG. 22

| Apparatus ID | Apparatus type | State flag | Importance | Message text |
|---|---|---|---|---|
| ... | ... | ... | ... | ... |
| 10 | Washing drying machine | One hour before night power time zone | Notify | Night electricity expense occurs in [n] minutes. Is operation reserved in [n] minutes? |
| 11 | Electric heater | Power OFF | Important | Do not leave room during use of electric heater. |
| 12 | TV | User [Adult: 1] powers TV ON | Notify | [Owner] powers TV ON. Should TV be powered ON? |
| 13 | Recorder | Operation error [error code] occurs | Error | Error number [error code] occurs. Please contact [URI]. |
| ... | ... | ... | ... | ... |

FIG. 33A

| Terminal ID | Positioning time | Current position information |
|---|---|---|
| 01 | 2012/12/24 14:45:41 +0900 | N35.6776 E139.7704 |

FIG. 33B

| Terminal ID | Type | Holder | Position |
|---|---|---|---|
| 01 | Smartphone | Father | N35.6776 E139.7704 |
| 02 | Smartphone | Father | Room 2 |
| 03 | Smartphone | Eldest daughter | uncertain |
| 04 | Home controller | None | |

FIG. 34A

| Terminal ID | Type | Setting room | Operable from outside? | State |
|---|---|---|---|---|
| 01 | Water heater | 01, 04 | N | Stopping |
| 02 | Air conditioner | 03 | Y | Operating |
| 03 | TV | 02 | Y | Operating |

FIG. 34B

| Room ID | State |
|---|---|
| 01 | None |
| 02 | One person (Mother) |
| 03 | One person (uncertain) |

FIG. 35

| Apparatus ID | Type | Setting room | State | Nearby person information | Operable processing |
|---|---|---|---|---|---|
| 02 | Air conditioner | 03 | Operating | 1 person (uncertain) | Power OFF* Change air volume* Change temperature* Set timer |
| 03 | TV | 02 | Operating | 1 person (Mother) | Power ON* Power OFF* Change channel* Change sound volume* Reserve watching |

FIG. 40

| Type | Operation | Operation in room | Remote operation from different room in home | Remote operation from outside of home |
|---|---|---|---|---|
| Air conditioner | Power ON | A | B | C |
| | Power OFF | A | B | B |
| | Change operation (mode, air volume, temperature) | A | B | B |
| | Set timer | A | A | A |
| TV | Power ON | A | C | C |
| | Power OFF | A | B | B |
| | Change channel | A | B | B |
| | Change sound volume | A | B | B |
| | Reserve watching | A | A | A |

CONTROL METHOD USED IN A REMOTE CONTROL SYSTEM

TECHNICAL FIELD

The present invention relates to control methods used in remote control systems.

BACKGROUND ART

In recent years, with the development of network environments in home, not only information apparatuses, such as personal computers, but also home appliances, such as television sets (TVs), video recorders, air conditioners, and refrigerators, have been getting connected to a network. The network connection provides various types of usability to users. For example, users can control home appliances via a network.

For example, Patent Literature 1 (PTL 1) discloses a technique relating to an integrated controller capable of appropriately controlling apparatuses including home appliances.

CITATION LIST

Patent Literature

[PTL 1] Japanese Unexamined Patent Application Publication No. 2003-111157

SUMMARY OF INVENTION

Technical Problem

However, the conventional technologies as disclosed in PTL 1 have problems. For example, users are allowed to control even home appliances having a heating function from the outside of home.

In order to address the above problem, an object of the present invention is to provide a control method of appropriately controlling a target apparatus according to a situation of the target apparatus by using an information terminal.

Solution to Problem

In accordance with an aspect of the present invention for achieving the object, there is provided a control method used in a remote control system including a plurality of apparatuses and an information terminal that controls at least one of the apparatuses as a target apparatus via a network, the control method including: displaying target apparatus candidates or action type candidates on a user interface region of a display unit of the information terminal, the target apparatus candidates being candidates for the target apparatus among the apparatuses, and the action type candidates being candidates for a target action type which a user wishes to take and being associated with respective operations on the target apparatus; obtaining, via the network, a plurality of control indexes used to determine a display mode for the user interface region of the display unit of the information terminal; displaying, on the user interface region of the display unit of the information terminal, one or more control menus in the display mode determined based on (i) the target apparatus or the target action type and (ii) the control indexes, the target apparatus being selected from the target apparatus candidates, and the target action type being selected from the action type candidates; generating a control signal for causing the target apparatus to perform an operation according to control corresponding to a control menu, when the control menu is selected from the one or more control menus displayed on the user interface region of the display unit of the information terminal; and transmitting the control signal to the target apparatus via the network.

These general and specific aspects may be implemented to a system, a method, an integrated circuit, a computer program, and a computer-readable recording medium, such as a Compact Disc-Read Only Memory (CD-ROM), and may be implemented also to a desired combination of them.

BRIEF DESCRIPTION OF DRAWINGS

FIG. 7 is a table indicating details of information transmitted from a remote control application to a server according to Example of Embodiment 1.

FIG. 8 is an example of a user information table registered in a database in the server according to Example of Embodiment 1.

FIG. 9 is an example of an apparatus information table registered in the DB in the server according to Example of Embodiment 1.

FIG. 14 is an example of an action history table according to Example of Embodiment 2.

FIG. 15 is a table of warning conditions for warning an operator (user) of an information terminal according to Example of Embodiment 2.

FIG. 22 is an example of a registered dialogue table according to Embodiment 3.

FIG. 33A illustrates an example of information transmitted at SD102 according to Embodiment 4.

FIG. 33B is an example of a user information table registered in a server according to Example of Embodiment 4.

FIG. 34A illustrates an example of a home apparatus table registered in the server according to Example of Embodiment 4.

FIG. 34B is an example of a sensor information table registered in the server according to Example of Embodiment 4.

FIG. 35 is an example of operable list information provided as a reply from the server to a smartphone at SD106 according to Example of Embodiment 4.

FIG. 40 is an example of an apparatus database stored in a server to determine whether or not an agreement inquiry is necessary according to Example of Embodiment 4.

Figure 1:
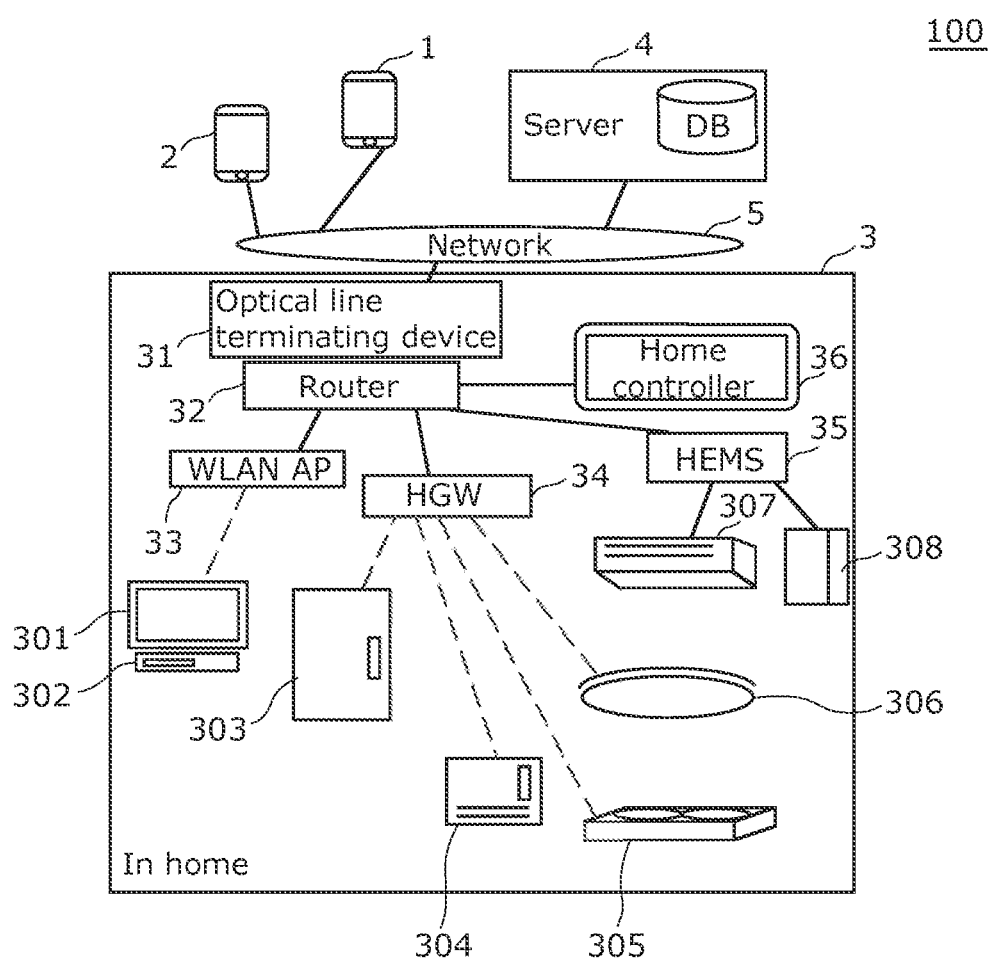
FIG. 1 is a diagram illustrating an example of an overall configuration of a remote control system according to Embodiment 1.

DESCRIPTION OF EMBODIMENT (Observation Based on which Present Invention is Conceived)

However, the conventional technologies as disclosed in PLT 1 have problems. For example, users can control even home appliances having a heating function from the outside of home.

More specifically, if one of home appliances is to be controlled (hereinafter, such a home appliance is referred to also as a "target apparatus"), controllable items (control menus) of providable functions of the target apparatus vary depending on various situations, for example, depending on an "operator (person who controls) (who)", a "time of operation (control) (when)", a "place for operation (control) (at where)", the "apparatus to be controlled (what)", and a "place where the apparatus to be controlled is set (to where)". Furthermore, it would be necessary to suppress certain control on apparatuses depending on situations in terms of operability, security, privacy, cost (electricity cost or the like), or noise and vibration (troubles to the others). For example, if a target apparatus is a home appliance having a heating function in home, it is considered to prevent control on such an apparatus from the outside of home.

In order to address the above problem, an object of the present invention is to provide a control method of appropriately controlling a target apparatus according to a situation of the target apparatus by using an information terminal.

In accordance with an aspect of the present invention for achieving the object, there is provided a control method used in a remote control system including a plurality of apparatuses and an information terminal that controls at least one of the apparatuses as a target apparatus via a network, the control method including: displaying target apparatus candidates or action type candidates on a user interface region of a display unit of the information terminal, the target apparatus candidates being candidates for the target apparatus among the apparatuses, and the action type candidates being candidates for a target action type which a user wishes to take and being associated with respective operations on the target apparatus; obtaining, via the network, a plurality of control indexes used to determine a display mode for the user interface region of the display unit of the information terminal; displaying, on the user interface region of the display unit of the information terminal, one or more control menus in the display mode determined based on (i) the target apparatus or the target action type and (ii) the control indexes, the target apparatus being selected from the target apparatus candidates, and the target action type being selected from the action type candidates; generating a control signal for causing the target apparatus to perform an operation according to control corresponding to a control menu, when the control menu is selected from the one or more control menus displayed on the user interface region of the display unit of the information terminal; and transmitting the control signal to the target apparatus via the network.

The above method enables the user to appropriately control a target apparatus according to a situation of the target apparatus by using the information terminal.

For example, it is also possible that the control indexes include any combination of: an attribute of an operator of the information terminal; when the information terminal is operated; where the information terminal is; where the target apparatus is; an attribute of the target apparatus; a state of the target apparatus; and an attribute of a target function of the target apparatus.

For example, it is further possible that the control indexes include a current position of an operator of the information terminal, and in the displaying of the one or more control menus, when the target apparatus has a heating function, the display mode is determined according to whether the current position is outside or inside of a home in which the target apparatus is located.

For example, it is still further possible that the control indexes include an attribute of an operator of the information terminal and a state of the target apparatus, in the displaying of the one or more control menus, when (i) the target apparatus has a heating function and (ii) the operator of the information terminal is a child, the one or more control menus displayed on the user interface region of the display unit of the information terminal include a predetermined control menu that is not selectable, the predetermined control menu being selectable when the operator of the information terminal is an adult.

For example, it is still further possible that the predetermined control menu is for powering the target apparatus ON, and in the displaying of the one or more control menus, only a control menu for powering the target apparatus OFF is displayed on the user interface region of the display unit of the information terminal as the one or more control menus, and the control menu for powering the target apparatus ON is not displayed on the user interface region.

For example, it is still further possible that the control indexes include an attribute and a current position of an operator of the information terminal, and in the displaying of the one or more control menus, when (i) the target apparatus has a heating function, (ii) the operator of the information terminal is a child, and (iii) the current position is in a home in which the target apparatus is located, the one or more control menus displayed on the user interface region of the display unit of the information terminal are identical to the one or more control menus displayed when the operator of the information terminal is an adult.

For example, it is still further possible that the control indexes include: an attribute of an operator of the information terminal; a current position of the operator of the information terminal; an attribute of a different operator of an information terminal different from the information terminal; and a current position of the different operator, and in the displaying of the one or more control menus, when (i) the target apparatus has a heating function, (ii) the operator of the information terminal is a child, (iii) the different operator of the different information terminal is near the current position of the operator of the information terminal, and (iv) the different operator of the different information terminal is an adult, the one or more control menus displayed on the user interface region of the display unit of the information terminal are same as the one or more control menus displayed when the operator of the information terminal is an adult.

For example, it is still further possible that when the action type candidates are displayed and the target action type is selected by an operator of the information terminal from the action type candidates, the displaying of the target apparatus candidates or the action type candidates includes determining whether or not an operation on the target apparatus which is associated with the target action type satisfies a warning condition for issuing a warning to the operator of the information terminal, and in the displaying of the one or more control menus, when it is determined in the determining that the operation satisfies the warning condition, the warning is displayed together with or superimposing on the one or more control menus on the user interface region of the display unit of the information terminal.

For example, it is still further possible that in the determining of whether or not the operation satisfies the warning condition, when the target action type is selected by the operator of the information terminal from the action type candidates, it is determined whether or not the operation on the target apparatus which is associated with the target action type satisfies a warning condition that the operation invades privacy of a person who is not the operator of the information terminal.

For example, it is still further possible that in the determining of whether or not the operation satisfies the warning condition, when the target action type is selected by the operator of the information terminal from the action type candidates, it is determined whether or not the operation on the target apparatus which is associated with the target action type satisfies a warning condition that the operation is an irreversible operation.

For example, it is still further possible that in the determining of whether or not the operation satisfies the warning condition, when (i) the target apparatus associated with the target action type is a video recorder and (ii) the operation on the target apparatus which is associated with the target action type is deletion of recorded content, it is determined that the operation on the target apparatus is the irreversible operation and satisfies the warning condition.

For example, it is still further possible that the control method further includes displaying a dialogue for inducing an operator of the information terminal to determine whether or not the target apparatus is to operate according to control corresponding to a control menu, when the control menu is selected from the one or more control menus displayed on the information terminal, wherein the generating of the control signal is performed when the operator of the information terminal determines, in the displaying of the dialogue, that the target apparatus is to perform the operation according to the control corresponding to the control menu.

For example, it is still further possible that the control method further includes displaying a dialogue for inducing an operator of the information terminal to confirm control information related to control corresponding to a control menu, when the control menu is selected from the one or more control menus displayed on the information terminal, wherein the generating of the control signal is performed when the operator of the information terminal confirms the control information in the displaying of the dialogue.

For example, it is still further possible that the control method further includes displaying a message for inquiring a person whether or not the person agrees with control corresponding to a control menu, when the control menu is selected from the one or more control menus displayed on the information terminal, the person being to be influenced by the control, wherein the generating of the control signal is performed after the person agrees with the control in the displaying of the message.

For example, it is still further possible that the person is using the target apparatus to perform the operation according to the control corresponding to the control menu.

For example, it is still further possible that the person using the target apparatus is one of (a) a person who is near the target apparatus and (b) a person who has controlled on the target apparatus, and the control corresponding to the control menu is one of (a) control for changing a state of the target apparatus and (b) control for causing the target apparatus to obtain information regarding privacy of the person.

For example, it is still further possible that in the displaying of the message, the message is displayed on a display apparatus different from the target apparatus.

For example, it is still further possible that in the generating of the control signal, the control signal for causing the target apparatus to peform an operation according to control corresponding to the control menu is not generated when the person disagrees with the control in the displaying of the message.

For example, it is still further possible that in the generating of the control signal, the control signal for causing the target apparatus to perform an operation according to control corresponding to the control menu is generated when the person has not replied to the inquiring over a predetermined time period in the displaying of the message.

These general and specific aspects may be implemented to a system, a method, an integrated circuit, a computer program, and a computer-readable recording medium, such as a CD-ROM, and may be implemented also to a desired combination of them.

The following describes a control method used in a remote control system according to Embodiment of the present invention with reference to the Drawings.

It should be noted that Embodiment described below is a specific example of the present invention. Numerical values, shapes, materials, constituent elements, arrangement positions and the connection configuration of the constituent elements, steps, the order of the steps, and the like described in the following Embodiment is merely an example, and is not intended to limit the present invention. Among the constituent elements in the following Embodiment, constituent elements that are not described in independent claims that show the most generic concept of the present invention are described as elements constituting more desirable configurations.

Embodiment 1

1.1 Overall Configuration of Remote Control System

The following describes a remote control system 100 according to Embodiment 1 with reference to the Drawings.

FIG. 1 a diagram illustrating an example of an overall configuration of the remote control system according to Embodiment 1.

A remote control system 100 illustrated in FIG. 1 includes: a plurality of apparatuses; and information terminals each of which controls at least one of the apparatuses as a target apparatus via a network 5. In Embodiment 1, the remote control system 100 includes an information terminal 1, an information terminal 2, operable apparatuses in home 3, and a server 4, all of which are connected to one another via the network 5.

The information terminals 1 and 2 are portable devices, such as smartphones and tablets, each of which has a display unit with a touch panel function. In the following description, the information terminals 1 and 2 are not limited to the above examples. The information terminals may be any kind of terminals as long as they have a display unit with a touch panel function and are capable of connecting the apparatuses in the home 3 to the server 4 via the network 5. In Embodiment 1, the information terminals 1 and 2 are described as smartphones.

In the home 3 illustrated in FIG. 1, there are various devices, such as an optical line terminating device 31, a router 32, a Wireless Local Area Network Access Point (WLAN AP) 33, a Home GateWay (HGW) 34, a Home Energy Management System (HEMS) 35, a home controller 36, apparatuses to be controlled (hereinafter, referred to simply as "apparatuses 300"), and the like.

Each of the information terminals 1 and 2 and the home controller 36 has a function of serving as a remote controller that requests a target apparatus to perform processing.

Examples of the apparatus 300 are a TV 301, a Blu-ray® Disc (BD) recorder 302, a door intercom 303, a heating appliance 304 such as a kotatsu (Japanese heating appliance), an Induction Heating (IT) cooking heater 305, a lighting device 306, an air conditioner 307, a water heater 308, and the like. The apparatus 300 is connectable to the server 4 via the HGW 3 on the network. In response to a processing request notified from the HGW 3, the apparatus 300 performs requested predetermined processing and notifies a result of the processing to the HGW 3.

The HGW 34 has a function of notifying the apparatus 300 in the home 3 of the processing request provided from the server 4, and notifying the server 4 of information obtained from the apparatus 300, the result of the processing, and the like.

The network 5 may be a local area network or a wide area network such as the Internet. In Embodiment 1, the network 5 is described as the Internet.

The server 4 receives a processing request from the information terminal 1 or the like, and performs processing requested in the processing request. In addition, the server 4 performs processing for inquiring the HGW 34 about information necessary to perform the requested processing, and notifies the processing request to a corresponding apparatus via the HGW 34.

1.2 Structure of Information Terminal

Figure 2:
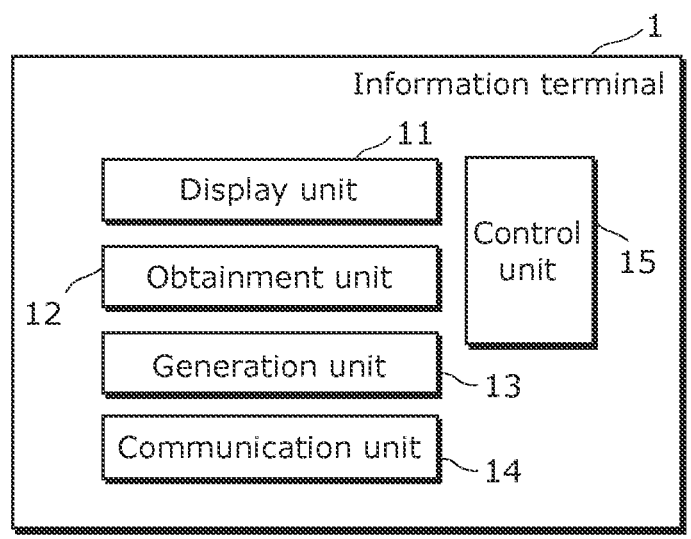
FIG. 2 is a block diagram illustrating an example of a structure of an information terminal according to Embodiment 1.

FIG. 2 is a block diagram illustrating an example of a structure of the information terminal according to Embodiment 1.

The information terminal 1 has a function of serving as a remote controller that requests a target apparatus 300 to perform processing. The information terminal 1 (hereinafter, referred to also as a "smartphone") has a device ID. The information terminal 1 is capable of determining a current position of the information terminal 1 by the Global Positioning System (GPS), and has a function of transmitting the position information to the server 4. When the information terminal 1 is to request the apparatus 300 to perform processing, the information terminal 1 notifies the apparatus 300 of the device ID and the current position information of the information terminal 1 as well as details of the control. By operating the information terminal 1, for example, a user (operator of the information terminal 1) is able to operate (control) the target apparatus 300 from outside of the home. For example, the user can reserve recording outside the home when the user has forgotten to reserve it, or power a kotatsu OFF outside the home when the user has forgotten to power it OFF.

The following describes the above in more detail. As illustrated in FIG. 2, the information terminal 1 includes a display unit 11, an obtainment unit 12, a generation unit 13, a communication unit 14, and a control unit 15.

Examples of the display unit 11 are a touch display and the like. The display unit 11 has a user interface region on which at least touch inputting is possible. The display unit 11 is controlled by the control unit 15. More specifically, on a display screen including the user interface region, the display unit 11 displays candidates for an action type, candidates for a target apparatus 300, control menus, or the like in a display mode determined by the control unit 15.

The obtainment unit 12 obtains, via the network 5, a plurality of control indexes for determining the display mode of the user interface region (display screen) of the display unit 11 of the information terminal 1.

Here, the control indexes include: an attribute of the operator of the information terminal 1; when the information terminal 1 is operated; where the information terminal 1 is; where a target apparatus 300 is; an attribute of the target apparatus 300; a state of the target apparatus 300; a function attribute of the target apparatus 300; and the like. The control indexes may be a combination of the above pieces of information. It should be noted that the control indexes will be described in more detail later and therefore the details are not explained here.

The control unit 15 causes the display unit 11 of the information terminal 1 to display, on the user interface region of the display unit 11, candidates for a target apparatus 300 to be controlled among the apparatuses, or action type candidates associated with respective operations on the target apparatus 300. The action type candidates are candidates for an action type which the user wishes to take. The control unit 15 causes the display unit 11 of the information terminal 1 to display, on the user interface region, one or more control menus in the display mode determined based on the selected action type or the selected target apparatus 300 and obtained control indexes.

Here, for example, if the control indexes include a current position of an operator of the information terminal 1 and the target apparatus 300 has a heating function, the control unit 15 may determine different display modes between the case where the current position is outside the home in which the target apparatus 300 is located and the case where the current position is in the home.

Furthermore, for example, if (i) the control indexes include an attribute of the operator of the information terminal 1 and the state of the target apparatus 300, (ii) the target apparatus 300 has a heating function, and (iii) the operator of the information terminal 1 is a child, then the control unit 15 may cause the display unit 11 of the information terminal 1 to display, on the user interface region, control menus in which a predetermined control menu is not selectable, although the predetermined control menu is selectable if the operator of the information terminal 1 is an adult.

Here, the predetermined control is control for powering the target apparatus 300 ON. In this case, the control unit 15 causes the display unit 11 of the information terminal 1 to display only a control menu for powering the target apparatus 300 OFF on the user interface region, and not to display a control menu for powering the target apparatus 300 ON.

Furthermore, for example, if (i) the control indexes include an attribute of the operator of the information terminal 1 and a current position of the operator, (ii) the target apparatus 300 has a heating function, (iii) the operator is a child, and (iv) the current position of the operator is in the home (home 3) in which the target apparatus 300 is located, then the control unit 15 may cause the display unit 11 of the information terminal 1 to display, on the user interface region, the same control menus as control menus displayed when the operator of the information terminal 1 is an adult.

Moreover, for example, if (i) the control indexes include (i-1) an attribute of the operator of the information terminal 1 and a current position of the operator of the information terminal 1 and (i-2) an attribute of an operator of the information terminal 2 different from the information terminal 1 and a current position of the operator of the information terminal 2, (ii) the target apparatus 300 has a heating function, (iii) the operator of the information terminal 1 is a child, (iv) the operator of the information terminal 2 is near the current position of the operator of the information terminal 1, and (v) the operator of the information terminal 2 is an adult, then the control unit 15 may cause the display unit 11 of the information terminal 1 to display, on the user interface region, the same control menus as control menus displayed when the operator of the information terminal 1 is an adult.

If a first control menu is selected from one or more control menus displayed on the user interface region of the display unit 11 of the information terminal 1, the generation unit 13 generates a control signal for causing the target apparatus 300 to perform an operation according to the control corresponding to the first control menu.

The communication unit 14 transmits the control signal generated by the generation unit 13 to the target apparatus 300 via the network 5.

1.3 Structure of Server

Figure 3:
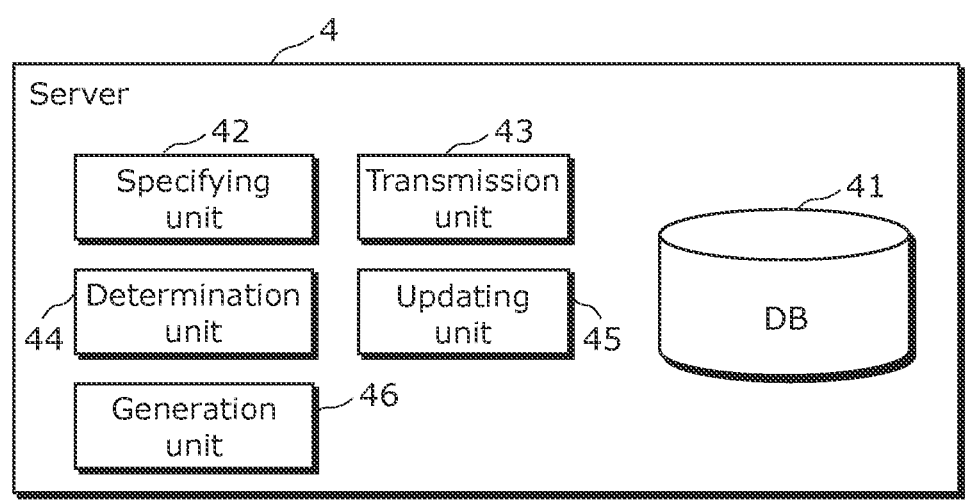
FIG. 3 is a diagram illustrating an example of a structure of a server according to Embodiment 1.

FIG. 3 is a block diagram illustrating an example of a structure of the server according to Embodiment 1.

The server 4 includes a database (DB) 41, a specifying unit 42, a transmission unit 43, a determination unit 44, an updating unit 45, and a generation unit 46.

The server 4 receives a processing request from the information terminal 1 or the like, and performs processing requested in the processing request. In addition, the server 4 performs processing for inquiring the HGW 3 about information necessary to perform the requested processing. The server 4 notifies the processing request to a corresponding apparatus 300 via the HGW 3.

The server 4 includes a database (DB) 41, a specifying unit 42, a transmission unit 43, a determination unit 44, an updating unit 45, and a generation unit 46.

In the DB 41, there are registered various pieces of information and the like regarding each of the apparatuses, such as a type, an apparatus ID, a function, and an owner (private owner or co-owners) of the apparatus. Since the apparatuses have respective different functions (providable functions), the registered pieces of information also differ depending on the apparatuses. For example, a kotatsu has functions of power ON and OFF, and the like, while a BD recorder has functions of power ON and OFF, reproduction, fast-forward, recording, reservation, and the like. For example, a water heater has functions of power ON and OFF, hot water temperature change, start of hot water supply to bath tab, and the like. An air conditioner has functions of power ON and OFF, operation mode change, target room temperature change, and the like. A TV has functions of power ON and OFF, channel change, sound volume change, watching reservation using a timer, and the like.

The specifying unit 42 specifies, based on a device ID, a holder (operator) of the information terminal 1 (smartphone) that has issued a processing request.

The determination unit 44 determines, based on current position information of the operator and registered position information of the home, whether the information terminal 1 (smartphone) that has issued the processing request is in the home 3 or outside the home 3.

The transmission unit 43 transmits an interface corresponding to an attribute of the specified holder (operator), the current position of the information terminal 1 (smartphone), an attribute of a target apparatus, and a function of the apparatus. In short, the transmission unit 43 can provide an interface according to the situation of the control unit 15 of the information terminal 1.

1.4 Operations of Remote Control System

Next, operations of the remote control system 100 having the above-described configuration are described.

Figure 4:
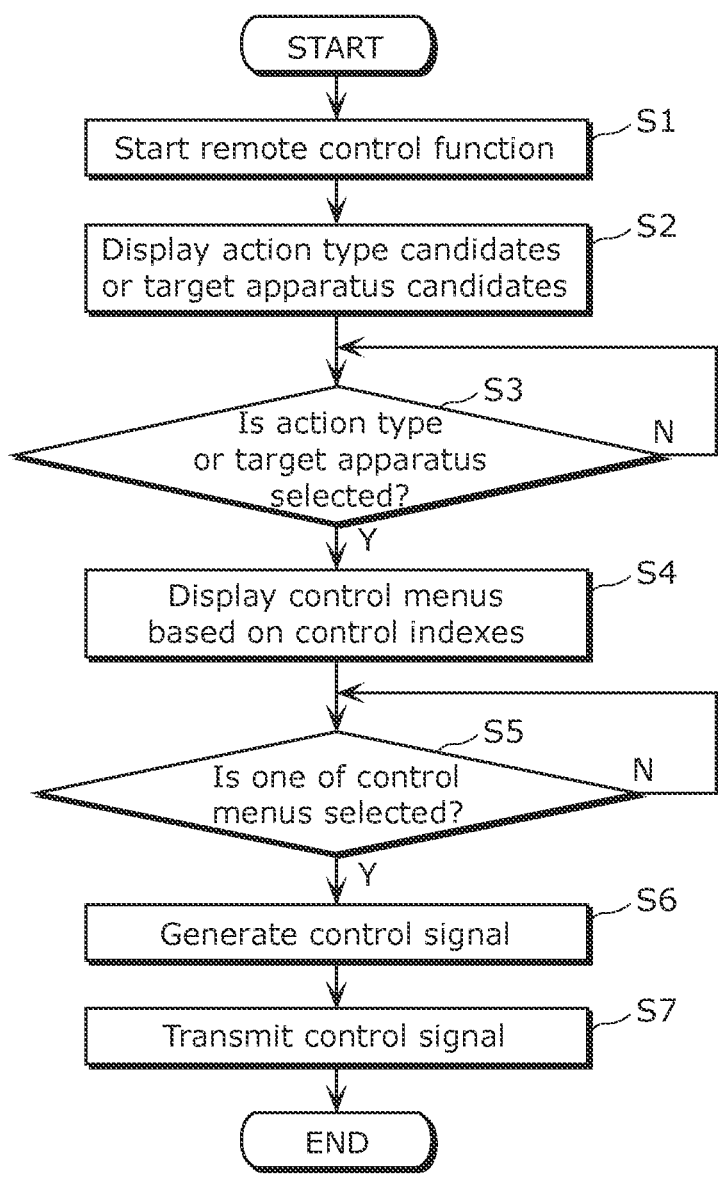
FIG. 4 is a flowchart of a control method performed in the remote control system according to Embodiment 1.

FIG. 4 is a flowchart of a control method performed by the remote control system according to Embodiment 1.

First, the user starts a remote control function of the information terminal 1 (S1). Here, for example, it is assumed that a function (remote control function) of the information terminal 1 (smartphone) for serving as a remote controller is provided by executing an application (remote control application) installed in the information terminal 1.

Next, the remote control system 100 causes the display unit 11 of the information terminal 1 to display, on the user interface region (display screen) of the display unit 11, candidates for a target apparatus 300 to be controlled among the apparatuses, or action type candidates associated with respective operations on the target apparatus 300 (S2). The action type candidates are candidates for an action which the user wishes to take. Then, the remote control system 100 obtains, via the network 5, control indexes for determining a display mode of the user interface region of the display unit 11 of the information terminal 1.

In Embodiment 1, the remote control system 100 causes the display unit 11 of the information terminal 1 to display, on the user interface region, candidates for a target apparatus 300 to be controlled among the plurality of apparatuses.

Next, it is determined whether or not one of the action type candidates or one of the candidates for a target apparatus 300 is selected by touch-inputting or the like of the operator of the information terminal 1 (S3).

If one of the action type candidates or one of the candidates for a target apparatus 300 is selected (Y at S3), then the remote control system 100 displays control menus based on the control indexes (S4). More specifically, if one of the action type candidates or one of the candidates for a target apparatus 300 is selected (Y at S3), then the remote control system 100 determines a display mode based on (a) the selected action type candidate or the selected candidate for a target apparatus 300 and (b) the obtained control indexes, and causes the display unit 11 of the information terminal 1 to display one or more control menus in the determined display mode on the user interface region. On the other hand, if it is determined at S3 that none of the action type candidates or the candidates for a target apparatus 300 is selected (N at S3), then the processing returns to S3 to perform processing.

Next, it is determined whether or not one of the control menus is selected by touch-inputting or the like of the operator of the information terminal 1 (S5). More specifically, the remote control system 100 determines whether or not one control menu (first control menu) is selected, by touch-inputting or the like of the operator of the information terminal 1, from one or more control menus displayed on the of the user interface region of the display unit 11 of the information terminal 1.

Next, if one of the control menus is selected (Y at S5), then the remote control system 100 generates a control signal (S6). More specifically, if one (first control menu) of the control menus is selected (Y at S5), then the generation unit 13 of the information terminal 1 generates a control signal for causing the target apparatus 300 to perform processing according to control corresponding to the selected first control menu. Here, the control signal corresponds to the above-described processing request. On the other hand, if it is determined at S5 that none of the control menus is selected (N at S5), then the processing returns to S5 to perform processing.

Next, the remote control system 100 transmits the control signal to the target apparatus via the network 5 (S7). More specifically, the communication unit 14 of the information terminal 1 transmits the control signal (processing request) generated by the generation unit 13 to the server 4. The server 4 transmits the received control signal (processing request) to the target apparatus 300 via the HGW 34.

1.5 Example

Figure 5:
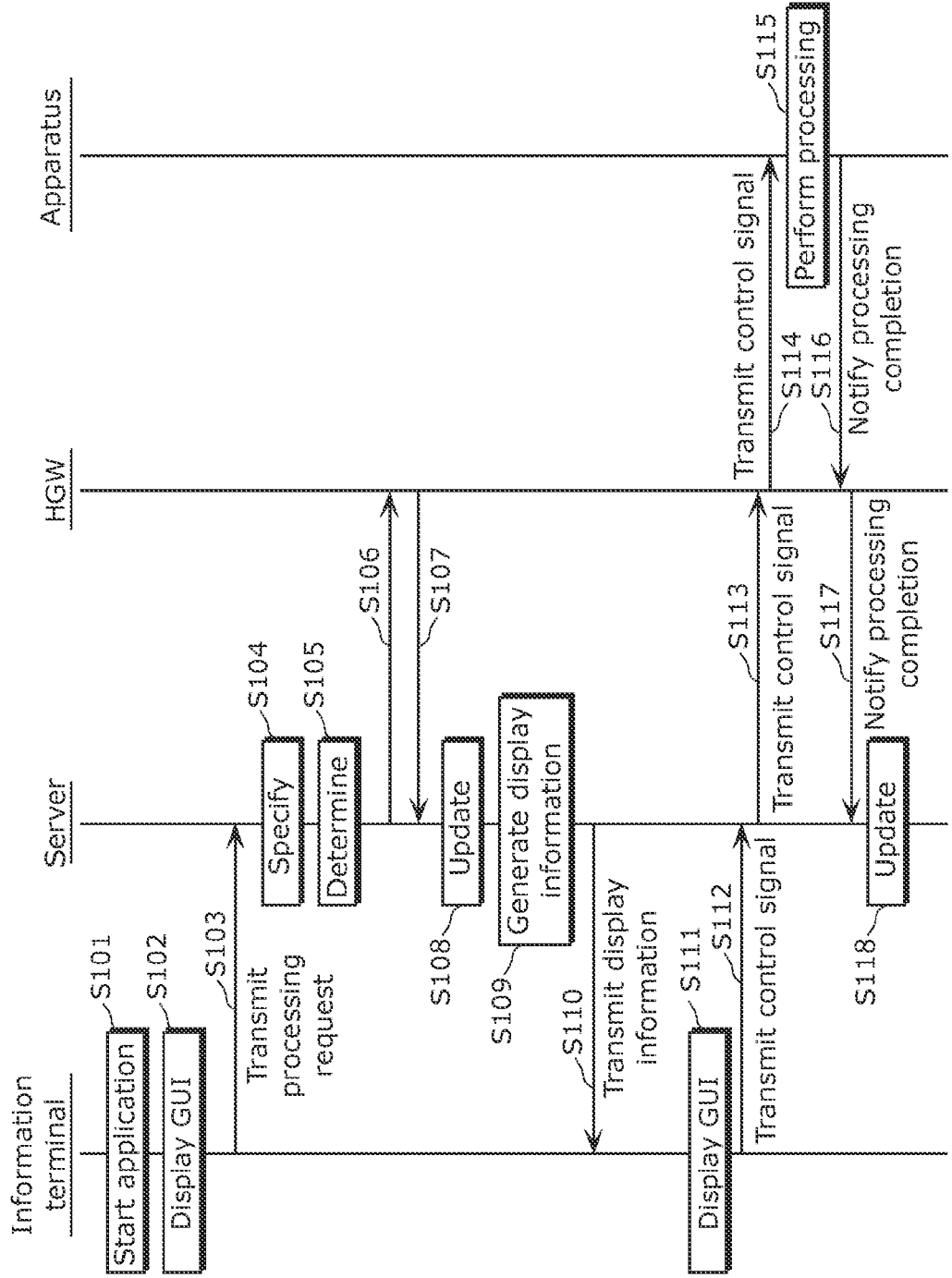
FIG. 5 is a time chart of an example of processing performed in the remote control system according to Example of Embodiment 1.

The following describes, as Example, an example of the remote control on an apparatus to be controlled, by the remote control system 100 operating as above, with reference to a time chart illustrated in FIG. 5.

FIG. 5 is a time chart illustrating an example of processing performed by the remote control system according to Example of Embodiment 1.

Here, a function of the smartphone (information terminal 1) for serving as a remote controller is assumed to be provided by executing a remote control application installed in the smartphone in the same manner as described previously.

First, an operator (hereinafter, referred to as a "user") of the smartphone (information terminal 1) starts the remote control application (S101).

Figure 6:
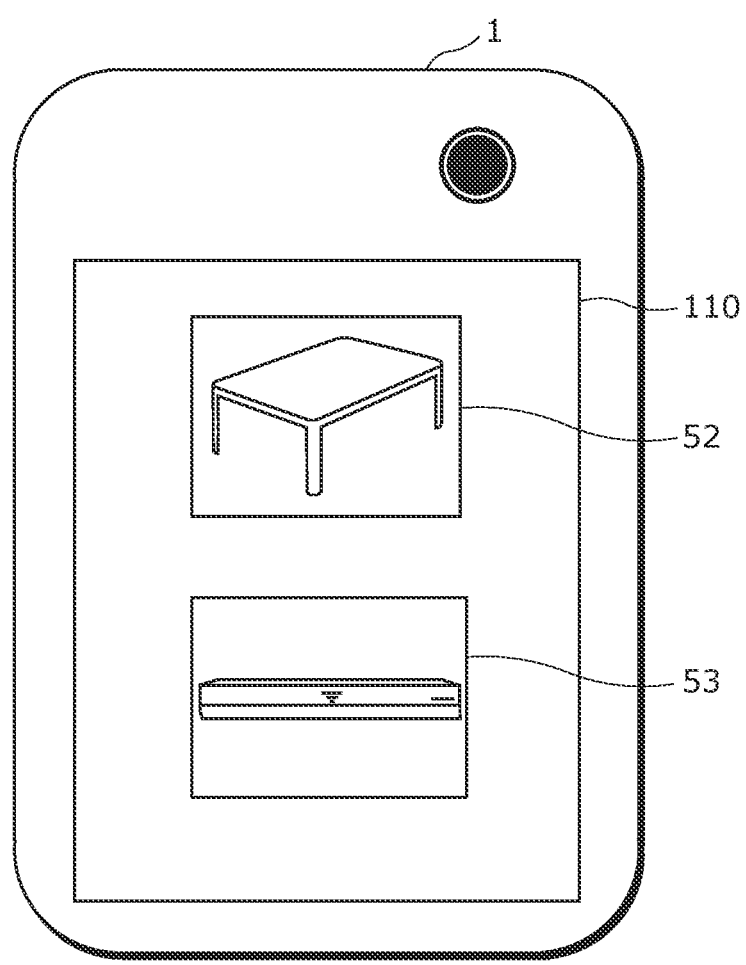
FIG. 6 is a diagram illustrating an example of a Graphical User Interface (GUI) on a display screen of a smartphone according to Example of Embodiment 1.

Then, the remote control application displays a Graphical User Interface (GUI) of the remote control application on a display screen 110 illustrated in FIG. 6 (S102).

FIG. 6 is a diagram illustrating an example of a display screen of the smartphone according to Example of Embodiment 1. The display screen 110 illustrated in FIG. 6 corresponds to the user interface region of the display unit 11. The user can perform touch inputting on the display screen 110. In the example illustrated in FIG. 6, the kotatsu and the BD recorder are displayed by icons (icons 52 and 53) as candidates for a target apparatus. If the kotatsu is to be controlled, the user taps (touch-inputs) the icon 52 of the kotatsu to select the kotatsu as a target apparatus.

Next, if the kotatsu is selected as a target apparatus, then the remote control application transmits, to the server 4, a processing request regarding the kotatsu together with, for example, pieces of information as illustrated in FIG. 7, such as an ID of the smartphone (information terminal 1), position information of the smartphone (positioning information by GPS), and an apparatus ID of the kotatsu (S103). It is assumed that the smartphone ID and the apparatus ID illustrated in FIG. 7 are previously shared by the server 4 and the remote control application. Here, FIG. 7 is a table indicating details of the information transmitted from the remote control application to the server according to Example of Embodiment 1.

The position information of the smartphone may include altitude information determined by GPS and the like in addition to the positioning information determined by the GPS. The positioning of the GPS in the position information may be performed regularly, when starting the remote control application, when transmitting to the server 4, or the like. The positioning method of the position information is not limited to GPS. For example, it is also possible to use position information of a base station of the smartphone, or estimate a current position of the smartphone from a move history using an acceleration sensor in the smartphone. It is further possible to determine that the user has left home when the user locks a front door of the home by using the smartphone. In short, there are various methods for estimating (determining) the position information, and any method can be used.

Next, the server 4 performs determination processing (S104). More specifically, the specifying 42 of the server 4 specifies an attribute of the user based on (a) the smartphone ID notified (transmitted) from the remote control application of the smartphone and (b) the user information table as illustrated in FIG. 8. FIG. 8 is an example of the user information table registered in the DB in the server according to Example of Embodiment 1, More specifically, if the smartphone ID notified from the remote control application (information terminal 1) is "1", the specifying unit 42 of the server 4 can specify, based on the user information table of FIG. 8, that a holder of the smartphone is a "father" who is an "adult".

Next, the server 4 performs determination processing (S105). More specifically, the determination unit 44 of the server 4 determines whether the smartphone that has issued the processing request is in the home 3 or outside the home 3, based on (a) the current position information of the smartphone which is notified from the remote control application of the smartphone and (b) registered position information of the home.

Here, for example, if a difference between the current position information of the smartphone and the position information of the home is within ±10 m, the determination unit 44 of the server 4 determines that the smartphone is in the home 3. Otherwise, the determination unit 44 determines that the smartphone is outside the home 3. If the smartphone is connected to a wireless LAN in the home 3, the determination unit 44 of the server 4 may determine that the smartphone is in the home 3 regardless of the positioning information.

If it is impossible to obtain the positioning information or if the positioning information is obtained but has a low accuracy, the determination unit 44 of the server 4 may determine that the smartphone is outside the home. This is to restrict functions of the smartphone usable outside the home 3 in view of security or the like, so as to prevent that the smartphone operates apparatuses from outside of the home 3 even if the smartphone has such a function. In the above cases, the security is enhanced if the smartphone is determined as being outside the home 3, rather than erroneously determined as being in the home 3.

Hereinafter, it is assumed that the determination unit 44 of the server 4 has determined at S105 that the smartphone (information terminal 1) which has issued the processing request is in the home 3.

Next, the server 4 performs updating processing for updating information of a current state of the apparatus (S108). More specifically, the updating unit 45 of the server 4 obtains a current state of the apparatus indicated by the apparatus ID notified from the smartphone via communications with the HGW 34 that is detecting real-time changing of the states of the apparatuses (S106 and S107). Therefore, the updating unit 45 of the server 4 updates items (current state of the target apparatus) in the apparatus information table, for example, as illustrated in FIG. 9 (S108). In Example of Embodiment 1, at S108, as illustrated in FIG. 9, the item indicating the state of the kotatsu having the apparatus ID of "1" is "power ON".

FIG. 9 is an example of the user information table registered in the DB in the server according to Example of Embodiment 1. In the DB 41 in the server, there are registered, as an apparatus information table, pieces of information regarding the apparatuses, for example, as illustrated in FIG. 9. In the apparatus information table illustrated in FIG. 9, an apparatus ID, an apparatus type, an owner, and operable functions of each of the apparatuses have already been registered.

Since the server 4 can obtain a state of the apparatus in real time via communication with the HGW 34, it is possible to reflect the current state of the apparatus to an item of the state in the apparatus information table that is registered in the DB 41.

It should also be noted that the server 4 may inquire the apparatus about the state of the apparatus via the HGW 34, every time a processing request is received from the smartphone.

Furthermore, the server 4 stores, as logs, a position of the smartphone, details of the processing request, the state of the apparatus, and the like in the DB 41, to be used as control indexes. Then, the server 4 may analyze the control indexes to determine a display mode of a control menu or a user interface of the apparatus.

Next, the server 4 generates display information based on the control indexes (S109). More specifically, the generation unit 46 of the server 4 determines whether each of an ON button and an OFF button as control menus is to be displayed or not to be displayed, based on an attribute of the user, a position of the smartphone, control indexes such as a current state of the kotatsu, and the apparatus information table of FIG. 9. Based on the result of the determination, the server 4 generates display information that indicates a display mode and details of display on the display unit 11 so as to provide the display information to the control unit 15 of the smartphone.

In Example of Embodiment 1, since the attribute of the user (holder) of the smartphone is an "adult", the current position of the smartphone is "in home", and the current state of the kotatsu is "powered ON", the generation unit 46 of the server 4 determines that the ON button is "not to be displayed" and the OFF button is "to be displayed" as control menus as illustrated in FIG. 9. The generation unit 46 of the server 4 generates display information based on the result of the determination. Although it has been described in Example of Embodiment 1 that the display information is generated by the server 4, the present invention is not limited to the above. It is also possible that the server 4 notifies the determination result to the remote control application, and the remote control application generates the display information based on the notified determination result.

Next, the server 4 (transmission unit 43) notifies (transmits) the generated display information to the remote control application (S110).

Figure 10A:
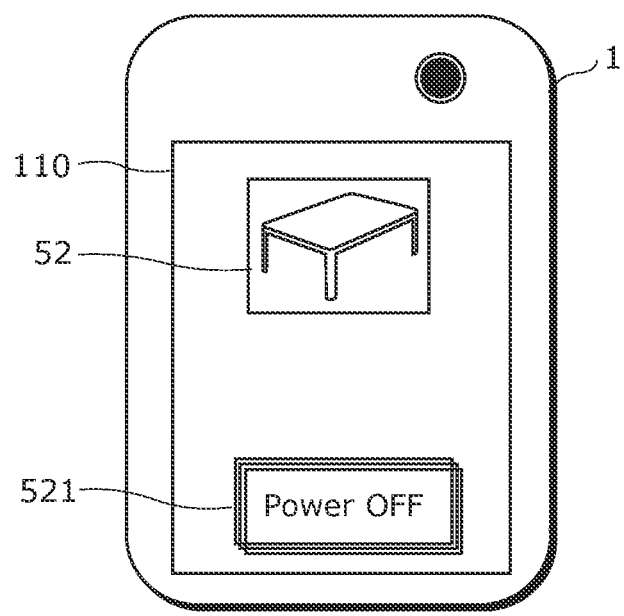
FIG. 10A is a diagram illustrating an example of a display screen of a smartphone according to Example of Embodiment 1.
Figure 10B:
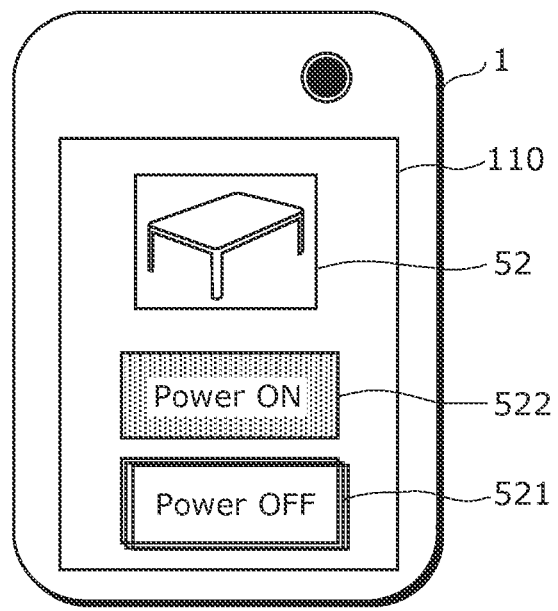
FIG. 10B is a diagram illustrating an example of a display screen of a smartphone according to Example of Embodiment 1.

Next, the remote control application displays a User Interface (UI) according to the notified (transmitted) display information (S111). More specifically, based on the transmitted display information, the remote control application (control unit 15) of the smartphone determines details (display details) and a display mode to be displayed on the user interface region of the display unit 11. Then, the remote control application causes the display unit 11 to display the determined display details in the determined display mode (display screen 110) as illustrated in FIG. 10A or FIG. 10B, for example. Each of FIG. 10A and FIG. 10B is a diagram illustrating an example of a display screen of the smartphone according to Example of Embodiment 1.

In Example of Embodiment 1, as illustrated in FIG. 10A, for example, based on the notified (transmitted) display information, the remote control application does not display the ON button as a control menu as determined at S109, and displays only the OFF button (power OFF button 521) as a control menu on the display screen 110 displayed on the display unit 11. It should be noted that, as illustrated in FIG. 10B, the remote control application may perform grayout display for the ON button (power ON button 522) that has been determined not to be displayed, thereby showing that the ON button is not selectable as a control menu.

Next, the user of the smartphone taps (touch-inputs) a button displayed on the display screen 110 (user interface region) to instruct execution of processing corresponding to the button. Then, the remote control application notifies (transmits), to the server 4, a control signal indicating the instruction of the execution of the processing (S112). In Example of Embodiment 1, the control signal instructs execution of powering OFF a target apparatus.

Next, the server 4 instructs, via the HGW 34, the target apparatus to perform the processing indicated by the control signal notified from the remote control application (S113, S114). In Example of Embodiment 1, since the target apparatus is the kotatsu, the server 4 instructs the kotatsu to perform the processing indicated by the control signal to be powered OFF (execution instruction).

Next, in receiving the control signal, the target apparatus performs the instructed processing (S115), and notifies completion of the processing to the server 4 via the HGW 34 (S116, S117). In Example of Embodiment 1, the kotatsu is powered OFF after receiving the control signal, and notifies completion of the processing to the server 4 via the HGW 34. It should be noted that it has been described that the apparatus receives the control signal, but the present invention is not limited to the above. It is also possible that the target apparatus receives only a signal for requesting the execution of the processing, from the server based on the control signal. In this case, the apparatus may perform the processing based on the signal.

Finally, from the target apparatus via the HGW 34, the server 4 receives the notification indicating that the processing is completed, and then updates information of a current state of the target apparatus (S118). In Example of Embodiment 1, the updating unit 45 of the server 4 is notified from the kotatsu via the HGW 34 that the processing has been completed, and updates the item "state" in the apparatus state table of FIG. 9 to "power OFF".

1.6 Effects

As described above, according to Embodiment 1, it is possible to provide a control method capable of appropriately controlling a target apparatus by using an information terminal according to a situation of the target apparatus.

More specifically, the control method according to Embodiment 1 is capable of suppressing certain control on apparatuses depending on situations in terms of security, privacy, cost (electricity cost or the like), noise and vibration (troubles to the others), or the like. For example, the control method according to Embodiment 1 is capable of suppressing remote control on a certain apparatuses having a risk of fire. As a result, it is possible to provide the control method offering not only operability for apparatuses.

(Variation 1)

According to Embodiment 1, the control unit 15 of the information terminal 1 changes details displayed on the display unit 11 and a display mode of the details depending on whether or not an attribute of the user is an "adult" or a "child". This is because, when a kotatsu is remote-controlled as a target apparatus 300, it is undeniable that the kotatsu has a risk of causing a fire in the worst case. Therefore, if the kotatsu that is powered OFF is to be powered ON from the outside of home, a smartphone (information terminal 1) displays, on the display unit 11 (remote control display screen), an "ON button" for adults who can consider the risk of fire so that the adults can power the kotatsu ON. On the other hand, for children who cannot consider the risk well, the smartphone (information terminal 1) does not display (or performs non-active display on) the "ON button" on the remote control display screen to prevent the children from powering the kotatsu ON. As a result, it is possible to prevent the risk of causing fire.

It should be noted that, even if the user is a child, when the current position of the user is "in home 3", it means that the user can easily consider a risk of fire. Therefore, even if the user of the smartphone is a child, the "ON button" may be displayed on the remote control display screen. Of course, it is also possible not to display the "ON button" on the remote control display screen regardless of the current position of the user who is a child.

(Variation 2)

It should be noted that it has been described in Embodiment 1 that an attribute of the user, a position of the smartphone, and states of the apparatuses are used as control indexes (indexes for determining a target of control), the present invention is not limited to the above. For example, it is possible that items listed below are desirably combined as control indexes.

(Term Explanation)

Attributes regarding a person include existence of handicap, demented/wandering, elderly (normal), an adult (working), an adult (house wife), an adult (father), an adult (mother), a male, a female, married, a single, with child, no child, minor, younger than eighteen-year old, a student, a child (student), a child (junior or high school student), a child (elementary school pupil), a child (small child), an infant (crawling), an infant (turning over in bed), individual-authenticated, and a relationship with a nearby person (family, relative, acquaintance/friend, boss/colleague/followership, client, or the like).

Attributes of a time includes a time of operating (early morning, morning, before noon, midday, afternoon, evening, night, midnight, or the like), a using duration, an accumulated using duration, a non-operating duration, last logon date/time, a date, a day of the week, a holiday, an anniversary, and sunrise/sunset times.

Inside home and outside home as places where an operator is present may include the followings.

Outside home: an office, a business trip destination, a station, a parking area, within . . . from home, near home, near outside of home, an entrance, a back door, a balcony Inside home: a living room, a bedroom, a bathroom, a restroom, a lavatory, a kitchen Inside home and outside home as a position where an apparatus is set or a current position may include the followings.

Outside home: near outside of home, an entrance, a back door, a balcony

Inside home: a living room, a bedroom, a bathroom, a restroom, a lavatory, a kitchen Attributes of an apparatus to be controlled may include a type of the apparatus (an electrical heater, a BD recorder, . . . ), whether or not to have a heating function, a kind of communication means (Wireless Fidelity (Wi-Fi), Near Field Communication (NFC), Power Line Communication (PLC), . . . ), existence of a security module, whether or not to deal with privacy information, a kind of a sensor, a kind of an input means, and the like.

Embodiment 2

In Embodiment 2, the description is given for the case where warning is also displayed if predetermined warning condition is satisfied when candidates for an action type are to be displayed on the interface region of the display unit of the information terminal (S2).

The following describes mainly differences from Embodiment 1.

A configuration of a remote control system and a structure of a server according to Embodiment 2 are the same as those according to Embodiment 1. Therefore, they are not described again below.

2.1 Structure of Information Terminal

Figure 11:
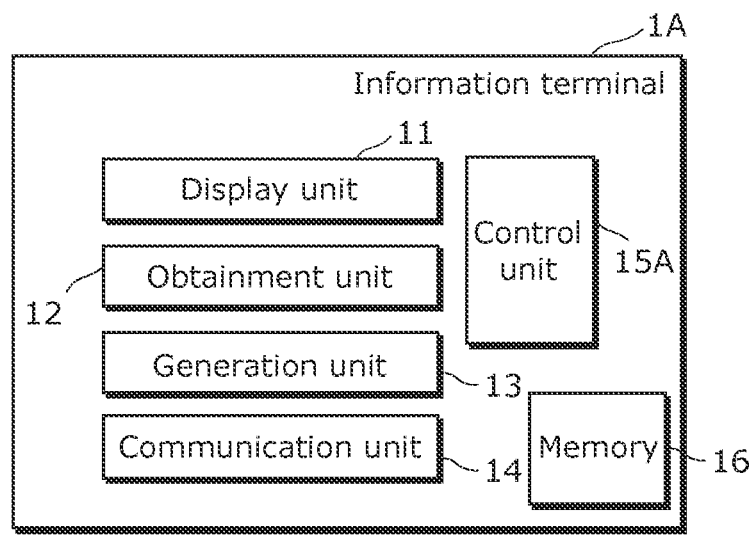
FIG. 11 is a block diagram illustrating an example of a structure of an information terminal according to Embodiment 2.

FIG. 11 is a block diagram illustrating an example of a structure of an information terminal according to Embodiment 2. It should be noted that the same reference numerals in FIG. 2 are assigned to the identical elements in FIG. 11, so that details of the identical elements are not described again below.

The information terminal 1A illustrated in FIG. 11 differs from the information terminal 1 according to Embodiment 1 in that a memory 16 is further provided and a control unit 15A has a function different from that of the control unit 15.

The control unit 15A causes the display unit 11 of the information terminal 1A to display, on the user interface region (display screen), action type candidates associated with respective operations on a target apparatus 300. The action type candidates are candidates for an action type which the user wishes to take. The control unit 15A displays, on the user interface region of the display unit 11 of the information terminal 1, one or more control menus in the display mode determined based on the selected action type candidate and obtained control indexes.

According to Embodiment 2, when action type candidates are displayed and an operator of the information terminal 1A selects one of the action type candidates, the control unit 15A determines whether or not an operation on an target apparatus 300, which is associated with the selected action type candidate, satisfies warning condition for warning the operator of the information terminal 1A. Then, when it is determined that the operation on the target apparatus 300 which is associated with the selected action type candidate satisfies the warning condition, the control unit 15A displays the warning together with control menus or overlapping the control menus on the user interface region of the display unit 11 of the information terminal 1A.

Here, for example, if the operator of the information terminal 1A selects one of the action type candidates, the control unit 15A may determine whether or not the operation on the target apparatus 300 which is associated with the selected action type candidate satisfies warning condition for notifying privacy invasion to a person different from the operator of the information terminal 1A.

Furthermore, for example, if the operator of the information terminal 1A selects one of the action type candidates, the control unit 15A may determine whether or not the operation on the target apparatus 300 which is associated with the selected action type candidate satisfies warning condition for notifying that the operation is an irreversible operation. For example, in this case, if the target apparatus 300 associated with the selected action type candidate is a video recorder, and the operation on the target apparatus 300 which is associated with the selected action type candidate is deleting of a recorded content item, the control unit 15A may determine that the operation on the target apparatus 300 is an irreversible operation and satisfies the warning condition.

The memory 16 holds information of the warning conditions which are referred to by the control unit 15A.

2.2 Operations of Remote Control System

Next, operations of the remote control system having the above-described configuration are described.

It should be noted that the operations of the remote control system according to Embodiment 2 are performed also according to the flowchart of FIG. 4. In Embodiment 2, S2 related to warning display is described in more detail.

Figure 12:
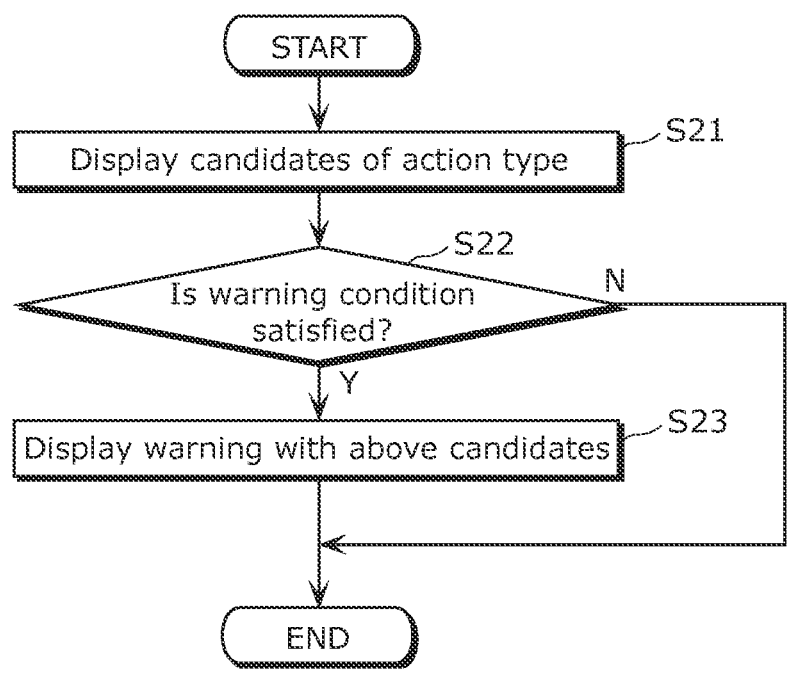
FIG. 12 is a flowchart of details of S2 performed in a remote control system according to Embodiment 2.

FIG. 12 is a flowchart of details of S2 performed by the remote control system according to Embodiment 2.

At S2, the remote control system causes the display unit 11 of the information terminal 1A to display, on the user interface region of the display unit 11, action type candidates associated with respective operations on the target apparatus (S2). The action type candidates are candidates for an action type which the user wishes to take.

More specifically, as illustrated in FIG. 12, first, the remote control system causes the display unit 11 of the information terminal 1A to display action type candidates on the user interface region of the display unit 11 (S21).

Next, when the operator of the information terminal 1A selects one of the action type candidates, the remote control system determines whether or not the operation on the target apparatus 300 which is associated with the selected action type candidate satisfies the warning condition for warning the operator of the information terminal 1A (S22).

Next, if the operation on the target apparatus 300 which is associated with the selected action type candidate satisfies the warning condition (Y at S22), then the remote control system causes the display unit 11 of the information terminal 1A to display the warning together with control menus or overlapping the control menus on the user interface region (S23).

It should be noted that, if it is not possible to determine that the operation on the target apparatus 300 which is associated with the selected action type candidate satisfies warning condition (N at S22), the remote control system terminates S2 and proceeds to S3 in FIG. 4.

2.3 Example

Figure 13:
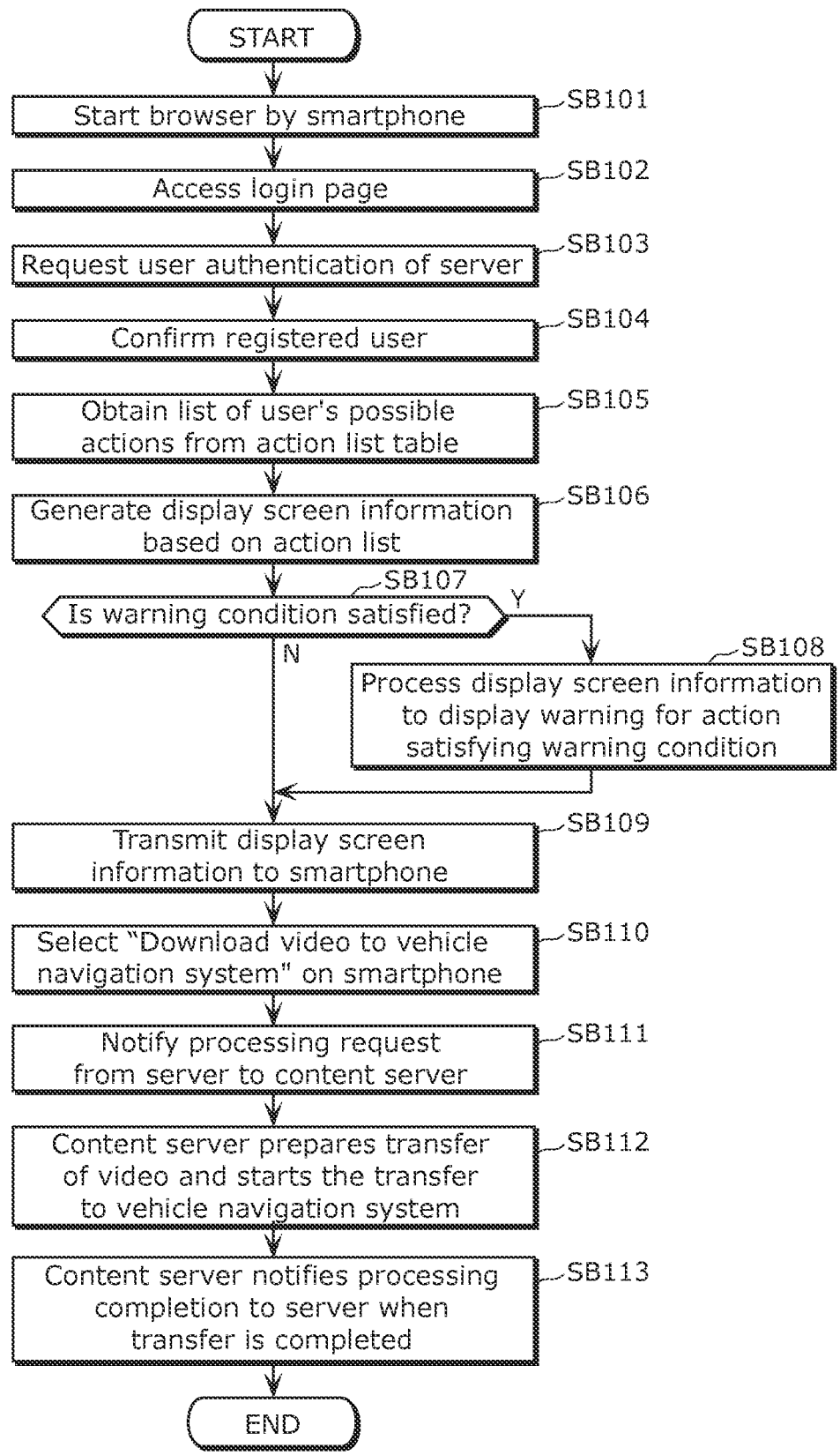
FIG. 13 is a flowchart of an example of processing performed in the remote control system according to Example of Embodiment 2.

The following describes, as Example of Embodiment 2, an example of remote control on a target apparatus by the remote control system operating as above, with reference to FIG. 13.

FIG. 13 is a time chart illustrating an example of processing performed by the remote control system according to Example of Embodiment 2.

According to Example of Embodiment 2, it is assumed that a function of a smartphone (information terminal 1A) for serving as a remote controller is provided when the smartphone accesses, via a viewer application (hereinafter, referred to as a "browser") such as a Web browser, the server 4 or a Web page provided by an application server program executed on the HGW 34. It is also assumed in Example of Embodiment 2 that the application server program is executed on the server 4.

(Smartphone to Server)

First, an operator (hereinafter, referred to as a "user") of the smartphone (information terminal 1) starts a browser on the smartphone (SB101). It should be noted that this step corresponds to S101 in Example of Embodiment 1.

Next, the smartphone accesses a login page provided by the server 4 via the browser (SB102).

Next, the smartphone requests user authentication, using a user ID and a password which are inputted by the user or stored in the smartphone (SB103).

(Server to Smartphone)

Next, the server 4 matches the obtained user ID to a user ID registered in the DB 41 of the server 4, so as to determine that the accessing user is a registered user (SB104), and associates the session to the user ID.

Next, the server 4 obtains a list of user's possible actions based on the user ID from an action list table as illustrated in FIG. 14, for example, which is stored in the DB41.

Here, FIG. 14 is an example of an action list table according to Example of Embodiment 2. In FIG. 14, the "action type" indicates a type of an action which the user can instruct to take, and the "apparatus ID" indicates an ID for uniquely identifying a target apparatus. It should be noted that a single action sometimes requires operations on a plurality of apparatuses. In this case, in each of columns following the "apparatus ID", a plurality of values corresponding to the plurality of apparatuses are indicated. Furthermore, the structure of the action list table may be regularized as a database.

The "apparatus type" indicates a type of the target apparatus. The "owner" indicates a person who manages the target apparatus. The "state" indicates a state of the target apparatus. The "required time" indicates a time required to perform the action in the case where the action is instructed to be taken. The "communication means" indicates a communication means to be used in the action.

The "privacy invasion degree" indicates a degree of privacy invasion caused by the action when the action is instructed and performed. The "privacy invasion degree" may dynamically vary depending on user's authority, a relationship with the owner, a time, a place, or the like.

The "irreversible operation" indicates whether or not, when the action is instructed and performed, control (operation) associated with an operation of the target apparatus which is associated with the action is irreversible once the control starts.

The "operation schedule" indicates a schedule of the action on the target apparatus. The "setting value allowable range" indicates an allowable range within which a user having the user ID can set a setting value. This setting value allowable range varies depending on an attribute of the user, a group to which the user belongs, or the like. For example, if the user is a child, the setting value allowable range of a temperature of an air conditioner is set to be a range from 15° C. to 20° C.

The "continuous operation allowable time period" indicates a time period used to determine whether or not to warn user or automatically power the target apparatus OFF if the target apparatus is kept operated over the time period. More specifically, if the target apparatus is kept operated over the continuous operation allowable time period, the server instructs the user's smartphone to display a warning notification.

The "operation cost" indicates a cost of consuming electricity, communications, water, gas, and the like which are required to perform the operation.

The "user authentication" indicates whether or not user authentication is necessary for the operation (control). The "start lag" indicates a time period that takes until the operation starts.

The "status obtainment" indicates whether or not it is possible to obtain a status after the operation from a far position. The "user position validity" indicates whether or not the operation (control) is valid at a user's position, in the case where a positional relationship between the user and the target apparatus influences validity of the operation (control). The "apparatus position" indicates a setting position of the target apparatus.

Next, the server 4 generates display screen information of the smartphone based on an action list obtained from the action list table illustrated in FIG. 14 (SB106). More specifically, based on the obtained action list, the server 4 generates information (display screen information) for displaying action type candidates on the display screen of the user's smartphone.

Figure 16A:
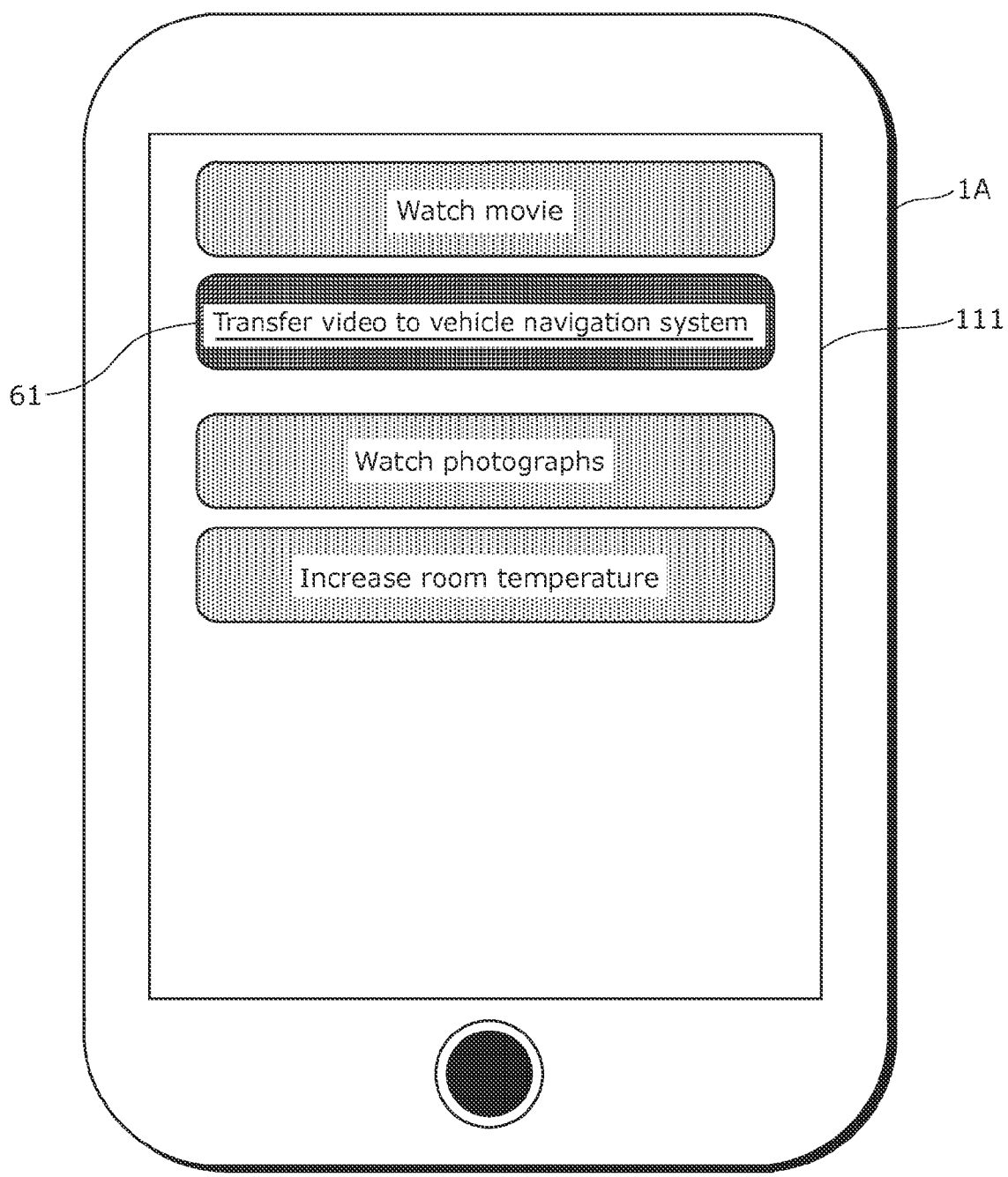
FIG. 16A is a diagram illustrating an example of a display screen displaying warning according to Example of Embodiment 2.

Next, if one of the action type candidates is selected, and an operation on a target apparatus which is associated with the selected action type candidate matches a warning condition as illustrated in, for example, FIG. 15 (Y at SB107), then the server 4 processes the display screen information generated to display a warning for the user on the display screen of the smartphone as illustrated in, for example, FIG. 16A (SB108).

FIG. 15 is a table of warning conditions under which warning is to be issued to the operator (user) of the information terminal according to Example of Embodiment 2. The example in FIG. 15 shows warning conditions which are conditions of operations and the like which affect the user (for example, operations which bother the user) when an operation (control) of the target apparatus which is associated with the selected action type candidate is performed.

Next, the server 4 transmits the generated display screen information (N at SB107) or the display screen information processed at SB108 to the smartphone (SB109).

Figure 16B:
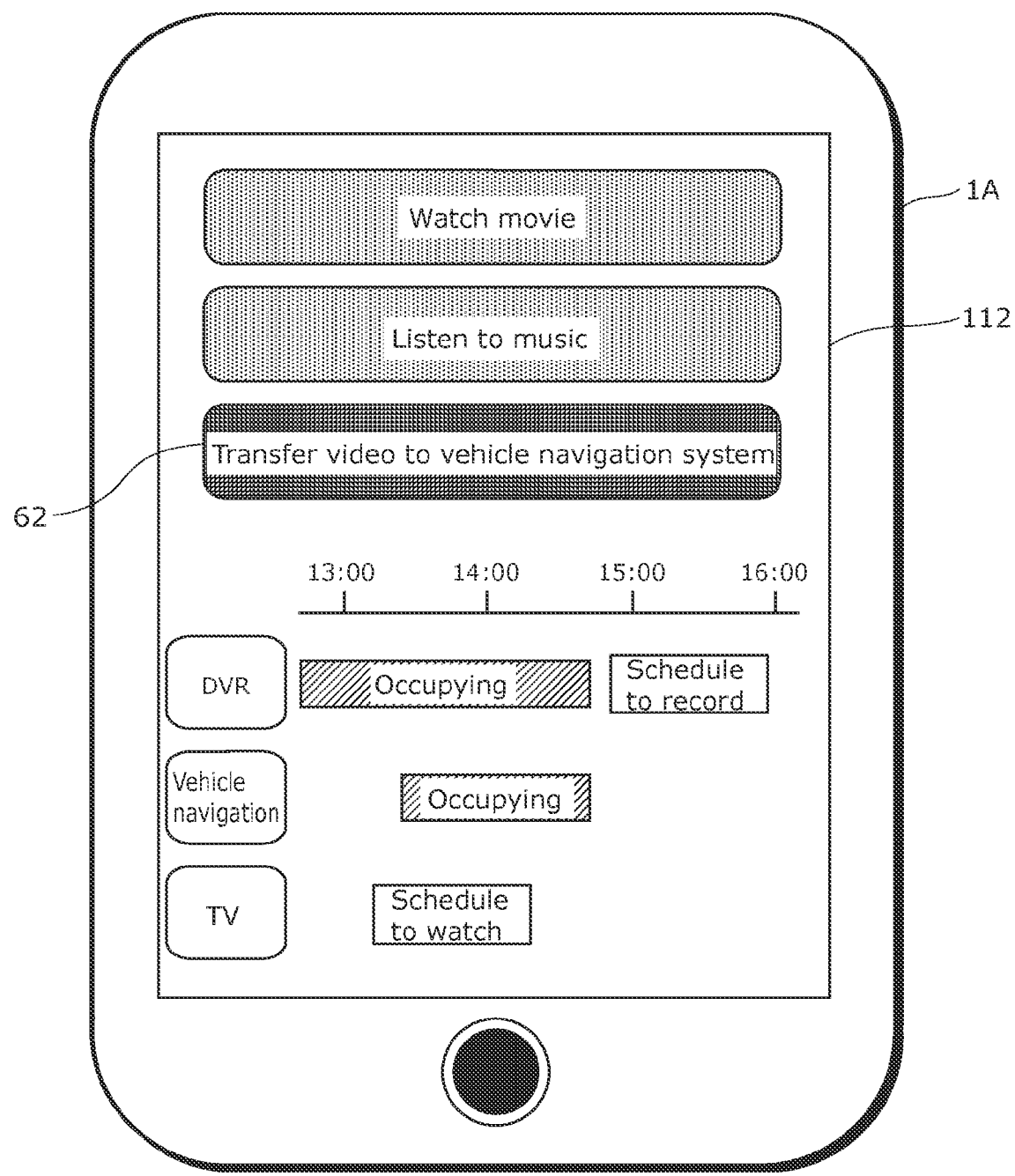
FIG. 16B is a diagram illustrating an example of a display screen displaying warning according to Example of Embodiment 2.
Figure 17:
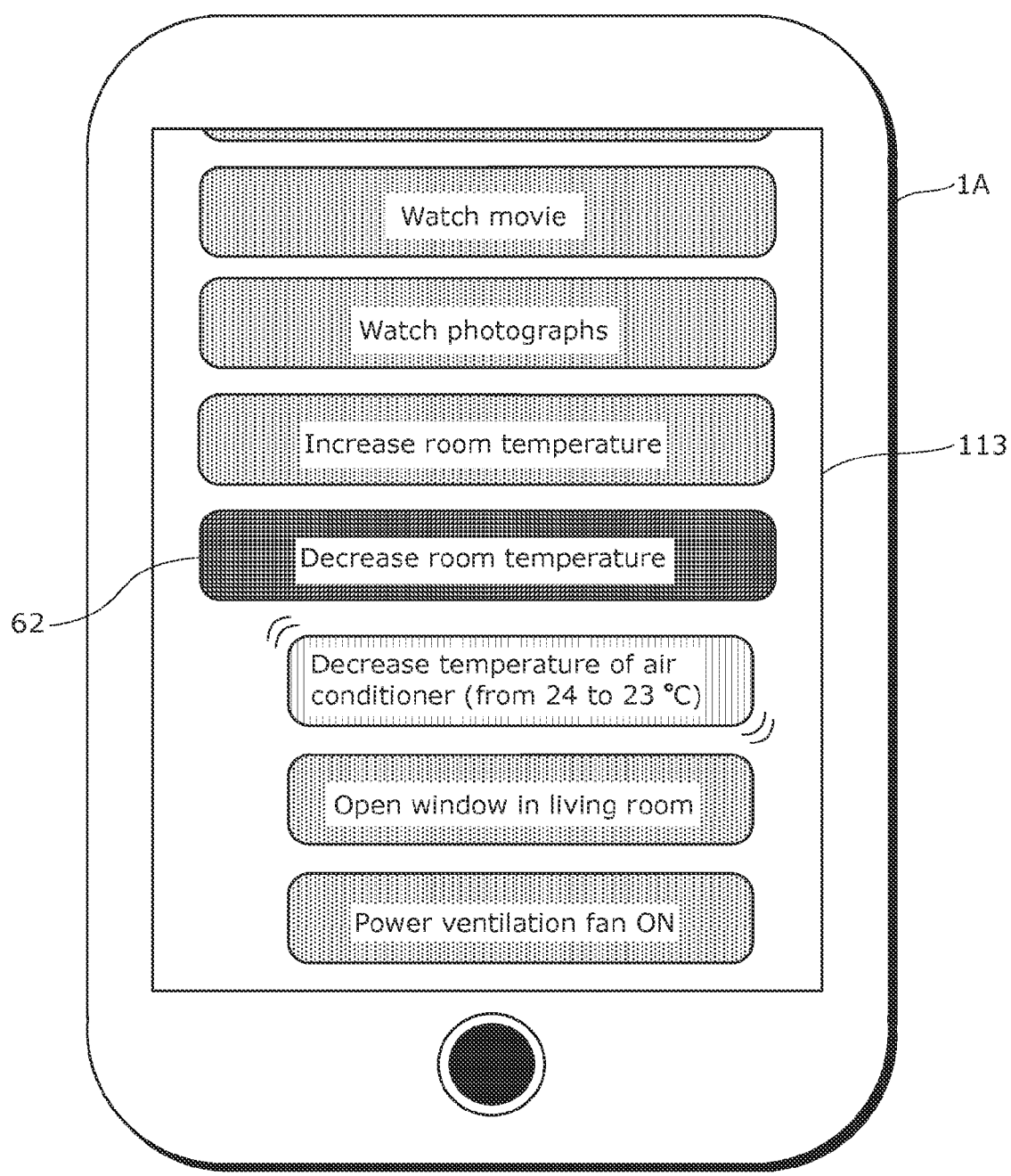
FIG. 17 is a diagram illustrating an example of a display screen displaying warning according to Example of Embodiment 2.
Figure 18:
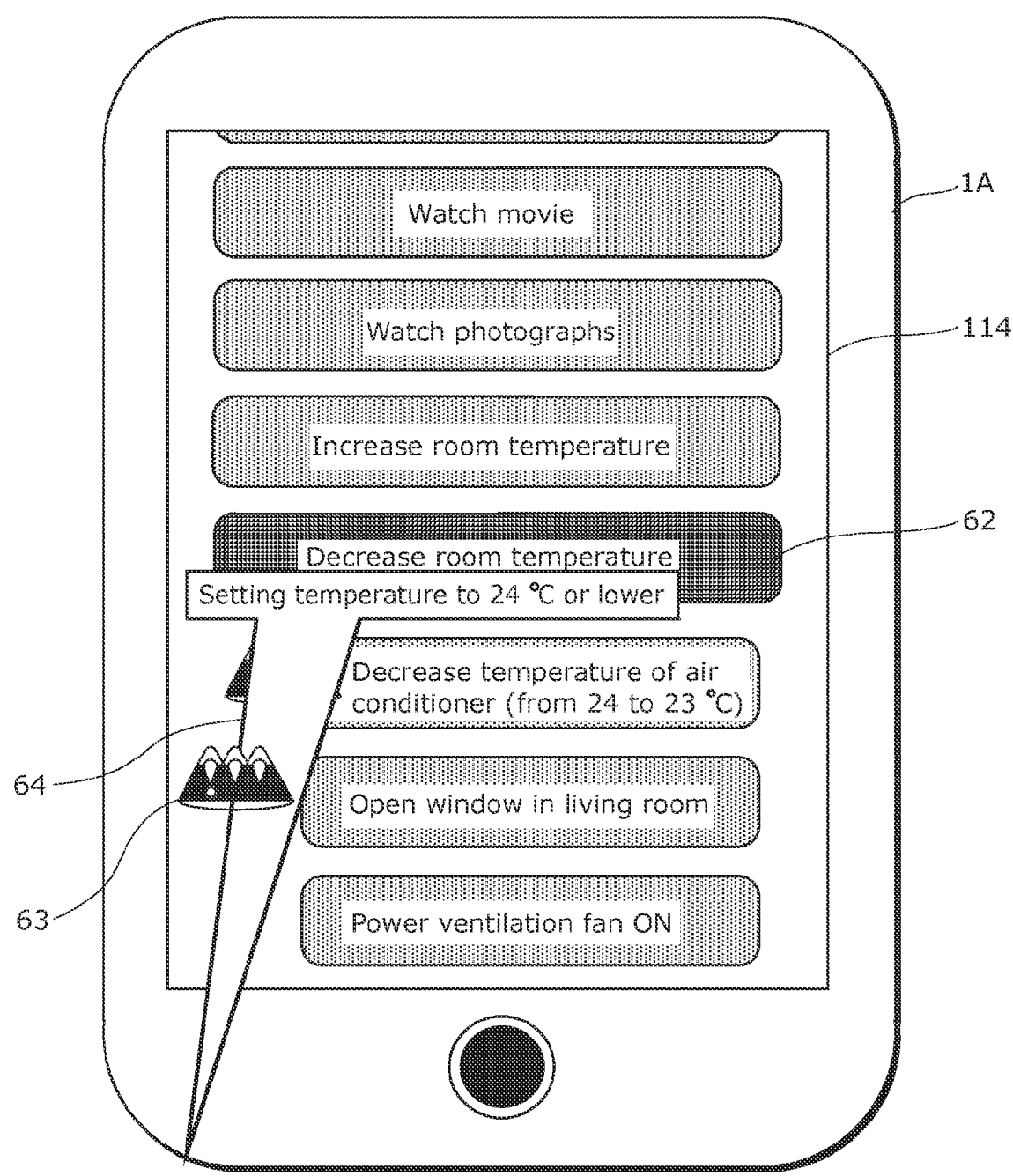
FIG. 18 is a diagram illustrating an example of a display screen displaying warning according to Example of Embodiment 2.

Each of FIGS. 16A and 16B are diagrams expressing an example of a display screen with a warning according to Example of Embodiment 2. On a display screen 111 illustrated in FIG. 16A, an item button 61 "Transfer video to vehicle navigation system" is underlined to be emphasized. This is because an action of downloading video to a vehicle navigation system (operation on apparatuses associated with the item button 61) causes a content server in the home 3 to convert or transfer the video after receiving the video. More specifically, the content server, which is different from the server 4 that is an apparatus holding the video, needs to convert or transfer the video into a format by which the vehicle navigation system is capable of reproducing the video. More specifically, the emphasis by underlining warns the user that the content server is not operable while the content server is converting or transferring the video.

It should be noted that, as seen in a display screen 112 illustrated in FIG. 16B, it is possible to display time lines of respective apparatuses associated with an item button 62 "Transfer video to vehicle navigation system" which is one of action type candidates. Thereby, it is possible to more clearly present the user with respective occupation times of the apparatuses as a warning.

Next, if the user taps a desired one of the action type candidates displayed on the smartphone to select it (SB110), the smartphone transmits the selected action type to the server 4 via the browser (SB111). In Example of Embodiment 2, the action type "Transfer video to vehicle navigation system" is selected from the action type candidates.

Next, the server 4 instructs, via the HGW 34, a target apparatus 300 to perform processing notified from the browser. In Example of Embodiment 2, the server 4 notifies a processing request to the content server in the home 3 to instruct the content server to transfer video to a vehicle navigation system (SB111). Here, the server 4 rewrites the "state" in the action list table to "video is currently transferred", and adds, in the "operation schedule", information indicating that "video is currently transferred" until a corresponding required time is expired.

When the content server receives the processing request, the content server transfers the video to the vehicle navigation system (SB112), and notifies completion of the processing to the server via the HGW (SB113).

Finally, the server 4 receives the notification of the processing completion from the content server, and therefore updates the "state" in the action list table to "Waiting" and deletes the completed schedule from the "operation schedule".

It should be noted that, at SB109, it is possible to process display screen information by using different emphasis methods depending on a degree of a warning. For example, when one of the action type candidates is selected to be performed, it is possible to change the number or kinds of icons or change color of an icon to more emphasized color depending on a time period for occupying a target apparatus associated with the selected action type.

Although it has been described above that the method for displaying a warning to the user is underlining one of the action type candidates which matches warning condition to emphasize the matching action type candidate, the method is not limited to the above. For example, the method may be as illustrated in FIGS. 17, 18, 19, 20A, and 20B.

Each of FIGS. 17 to 20B is a diagram expressing an example of a display screen with a warning according to Example of Embodiment 2. For example, as seen in a display screen 113 illustrated in FIG. 17, it is possible that a different edge design is used for an item button 62, and that vibrating animation is used to display a warning. Furthermore, as seen in a display screen 114 illustrated in FIG. 18, it is also possible that the number of icons 63 or a balloon 64, which is displayed with or superimposed on an item button 62, shows a warning.

Figure 19:
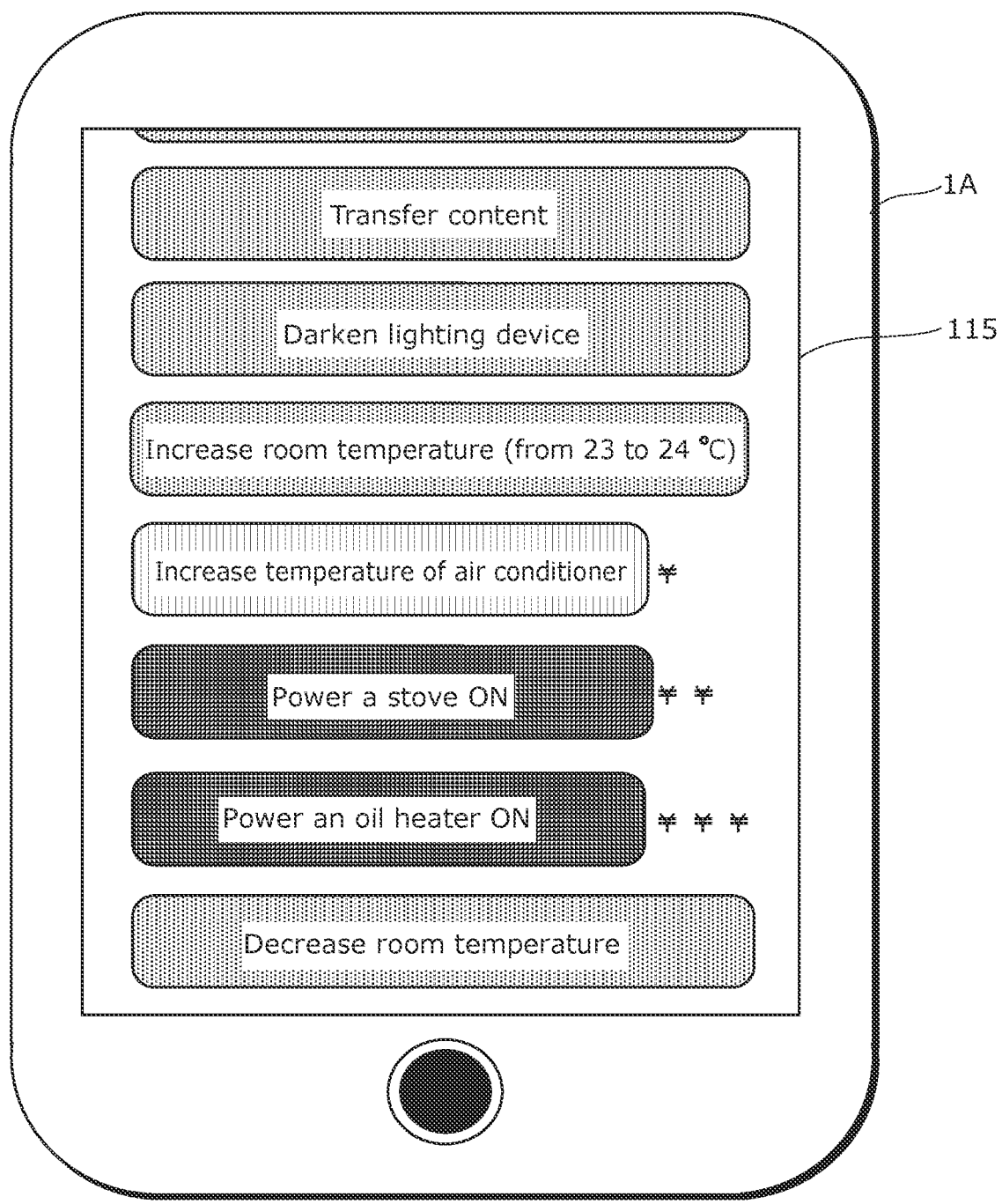
FIG. 19 is a diagram illustrating an example of a display screen displaying warning according to Example of Embodiment 2.

Moreover, as seen in a display screen 115 illustrated in FIG. 19, it is further possible that the number of icons or color of an icon is varied depending on an operation cost caused by performing the action type, thereby expressing a degree of a warning.

Figure 20A:
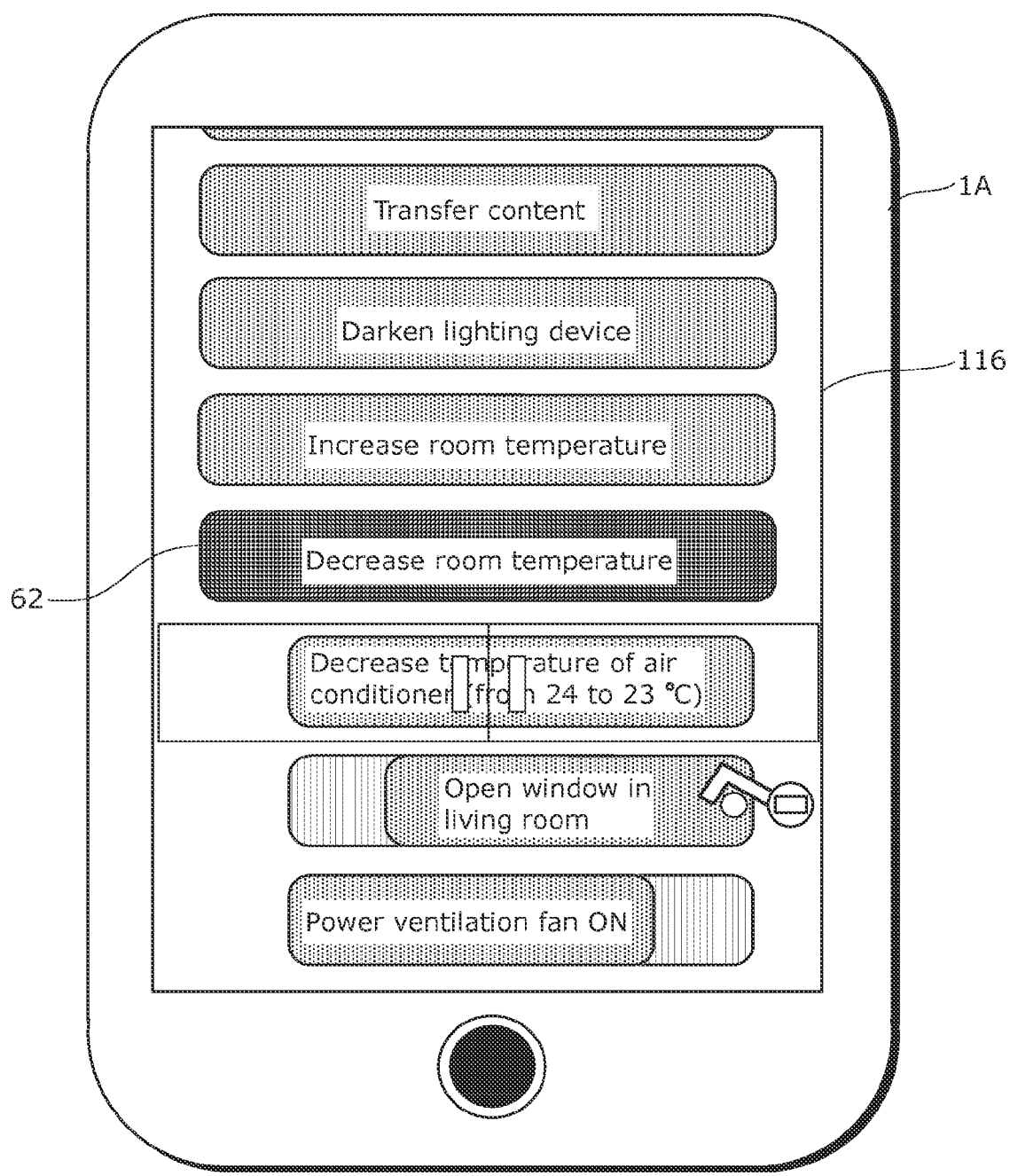
FIG. 20A is a diagram illustrating an example of a display screen displaying warning according to Example of Embodiment 2.
Figure 20B:
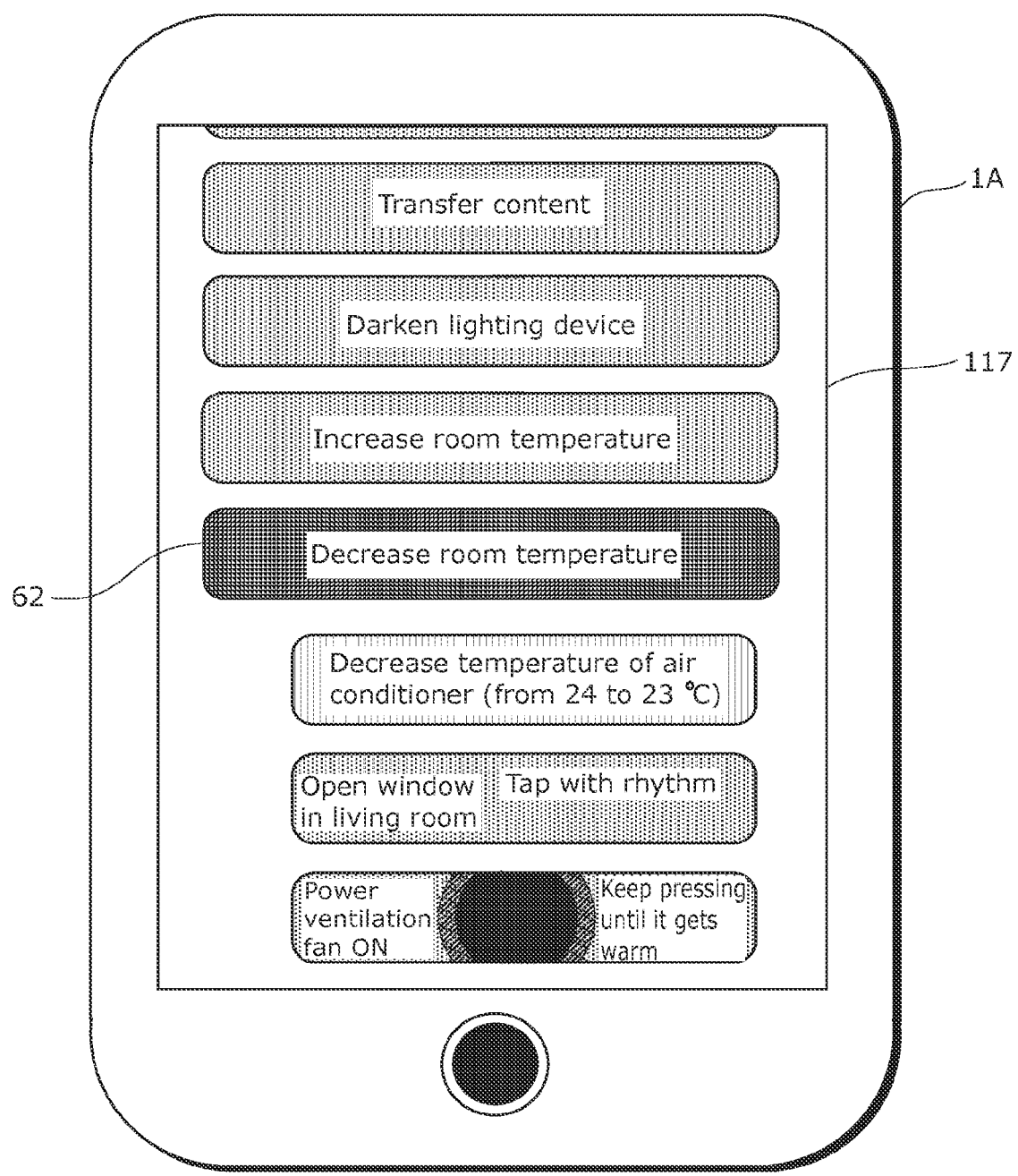
FIG. 20B is a diagram illustrating an example of a display screen displaying warning according to Example of Embodiment 2.

In addition, as seen in a display screen 116 illustrated in FIG. 20A or a display screen 117 illustrated FIG. 20B, it is possible that, when the user selects an item button 62 that matches warning condition, the user is required, for example, to tap a lock icon. Through the increased processes up to selection of the item button 62, the user is indirectly warned.

It should be noted that the method for waning the user is not limited to the above examples. It is also possible to use more various warnings or degrees of a warning by appropriately combining the following warning methods.

(Warning Methods)

Examples of the warning method are: displaying of an icon; changing of color; changing of a size; displaying of a dialogue; changing of a degree of vibration in selecting; changing of a sound volume in reading or selecting; changing of a letter font, a letter type, or a letter size; changing of a method of surrounding or bordering; changing of a balloon; changing of an underline; changing of animation (scaling, vibration, or the like); enabling of operation by long pressing or pressing plural times; not enabling of display or operation until operation of lock icon touching or the like is released; and displaying of a warning an upper or lower position of a list.

2.4 Effects

As described above, according to Embodiment 2, it is possible to provide a control method capable of appropriately controlling a target apparatus by using an information terminal according to a situation of the target apparatus.

More specifically, in the control method according to Embodiment 2, when action type candidates are to be displayed on the display unit of the information terminal, if at least one of the candidates satisfies any predetermined warning condition, a warning is also displayed. As a result, the user is warned that a corresponding operation (control) affects the user, so that the user can perform the control after checking whether or not the operation affects the user.

It should be noted that, in Embodiment 2, when action type candidate are to be displayed on the interface region of the display unit 11 of the information terminal 1A (S2), if at least one of the action type candidates satisfies any predetermined warning condition, a warning is also displayed. However, it is also possible that, when control menus based on control indexes are to be displayed on the interface region of the display unit 11 of the information terminal 1A (S4), if at least of the control menus satisfies any predetermined warning condition, a warning is also displayed.

Embodiment 3

In Embodiment 3, the description is given for the case where, when one of control menus is selected on the interface region of the display unit of the information terminal (Y at S5), if a selected apparatus satisfies a predetermined condition, a dialogue is also displayed. Here, the dialogue is a message for inducing the user to take a certain action. More specifically, the dialogue is a message displayed for requesting the user to input, or for presenting the user with some notification.

The following describes mainly differences from Embodiment 1.

A configuration of a remote control system and a structure of a server 4 according to Embodiment 3 are the same as those according to Embodiment 1. Therefore, they are not described again below.

3.1 Structure of Information Terminal

Figure 21:
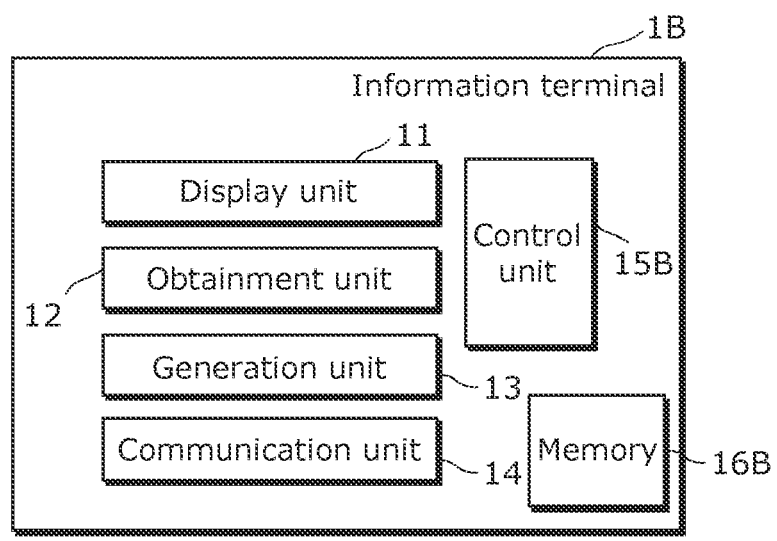
FIG. 21 is a block diagram illustrating an example of a structure of an information terminal according to Embodiment 3.

FIG. 21 is a block diagram illustrating an example of a structure of an information terminal according to Embodiment 3. It should be noted that the same reference numerals in FIGS. 2 and 11 are assigned to the identical elements in FIG. 21, so that details of the identical elements are not described again below.

An information terminal 1B illustrated in FIG. 21 differs from the information terminal 1 according to Embodiment 1 in that a memory 16B is further provided and a control unit 15B has a function different from the function of the control unit 15.

The control unit 15B causes a display unit 11 of the information terminal 1B to display, on a user interface region (display screen) of the display unit 11, candidates for a target apparatus 300 to be controlled among the apparatuses. Furthermore, the control unit 15A causes the display unit 11 of the information terminal 1B to display, on the user interface region, one or more control menus in a display mode determined based on the selected target apparatus 300 and obtained control indexes.

In Embodiment 3, when one (first control menu) of the control menus displayed on the user interface region of the display unit 11 of the information terminal 1B is selected, the control unit 15B causes the display unit 11 of the information terminal 1B to display a dialogue for inducing an operator of the information terminal 1B to determine whether or not to operate the target apparatus 300 according to the control corresponding to the first control menu. Furthermore, if the operator of the information terminal 1B determines that the target apparatus 300 is to perform an operation according to the control corresponding to the first control menu, then the control unit 15B causes the generation unit 13 to generate a control signal.

It should be noted that, when the first control menu is selected from the control menus displayed on the information terminal 1B, the control unit 15B may cause the display unit 11 of the information terminal 1B to display a dialogue for inducing the operator of the information terminal to confirm control information related to the control according to the first control menu. In this case, it is possible that, when the operator of the information terminal 1B confirms the related control information, the control unit 15B causes the generation unit 13 to generate a control signal.

The memory 16B holds, for example, a registered dialogue table as illustrated in FIG. 22 as conditions for displaying a dialogue for inducing the operator to perform the confirmation. The registered dialogue table is referred to by the control unit 15B. FIG. 22 illustrates an example of the registered dialogue table according to Embodiment 3.

As illustrated in FIG. 22, in the registered dialogue table, an apparatus ID of a target apparatus, a state flag at the time of user's operation, an importance, and a message text are associated with one another. It should be noted that this registered dialogue table may be held in a DB 41 of the server 4, not in the memory 16B of the information terminal 1B.

The "state flag" is an item indicating a condition for displaying a corresponding dialogue when the user performs operation (control) on a corresponding target apparatus.

The "importance" is an item indicating an importance of details to be displayed as a "message text". A method of displaying a dialogue is determined based on the importance. In Embodiment 3, for example, there are three modes of "Notify", "Important", and "Error" for the display method of the importance. Of course, the modes are not limited to the three modes, but any number of modes are possible if they are determined based on the number of levels classified according to the importance.

The "message text" is an item indicating a text to be displayed in a corresponding dialogue.

Although, in the example of the registered dialogue table illustrated in FIG. 22, one item is allocated for one apparatus, the present invention is not limited to this. It is possible to allocate a plurality of items to one apparatus.

3.2 Operations of Remote Control System

Next, operations of the remote control system having the above-described configuration are described.

It should be noted that the operations of the remote control system according to Embodiment 3 are performed also according to the flowchart of FIG. 4. In Embodiment 3, processing for dialogue, which is performed between "Y at S5" and "S6" (in other words, between S5 and S6), is described.

Figure 23:
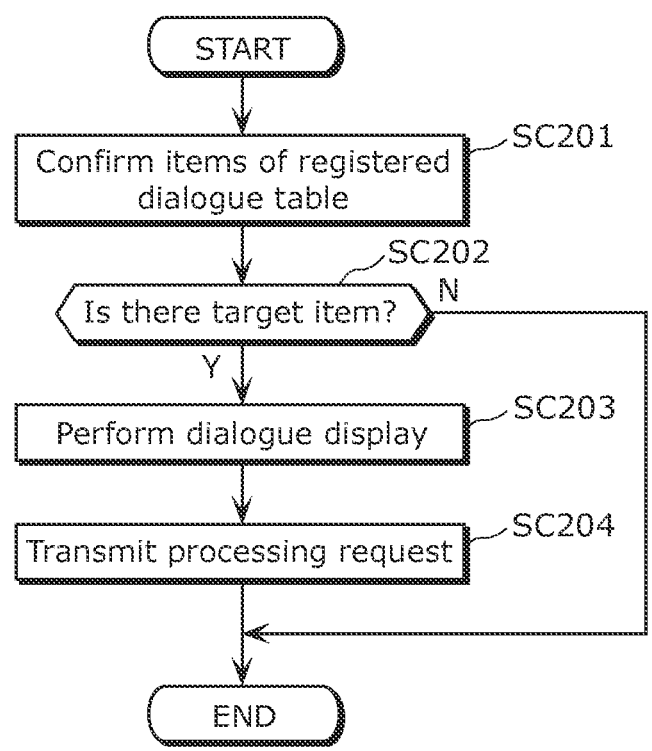
FIG. 23 is a flowchart of dialogue processing performed in a remote control system according to Embodiment 3.

FIG. 23 is a flowchart of details of the dialogue processing performed by the remote control system according to Embodiment 3.

Here, the information terminal 1B is assumed to be a smartphone. The function of the smartphone (information terminal 1B) for serving as a remote controller is assumed to be provided by executing the remote control application installed in the smartphone in the same manner as described in Embodiment 1. It is also assumed that the registered dialogue table illustrated in FIG. 22 is managed by the server 4.

First, at S5 of FIG. 4, the remote control system is assumed to determine whether or not one of control menus is selected by touch-inputting or the like of the operator of the information terminal 1B, and thereby determines that one of the control menus is selected (Y at S5).

In this case, the remote control system determines whether or not a state of a target apparatus to perform processing according to the selected control menu satisfies the item in the registered dialogue table managed by the server 4 (SC201). More specifically, the server 4 searches the registered dialogue table for an ID of the target apparatus to perform the processing according to the selected control menu, and determines whether or not the state of the target apparatus satisfies details of the state flag. If the state of the target apparatus matches the item of the state flag, the server sends the item back to the remote control application.

Next, if a result sent back from the server 4 includes the item which the state of the target apparatus matches (Y at SC202), then the remote control application of the smartphone determines a dialogue format according to a level of an importance, and therefore displays a dialogue in the dialogue format (SC203).

Finally, when the user finally makes selection, the remote control application transmits a processing request to the server 4 (SC204). More specifically, if the operator of the information terminal 1B determines that the target apparatus 300 is to perform an operation according to the control corresponding to the selected first control menu, then the remote control system causes the generation unit 13 to generate a control signal. Then, the remote control system transmits the generated control signal to the server.

3.3 Dialogue Display Examples

The following describes examples of a dialogue displayed on the information terminal 1B.

Each of FIGS. 24A to 28B is a diagram illustrating an example of a dialogue displayed on a display screen of the information terminal according to Embodiment 3.

Figure 24A:
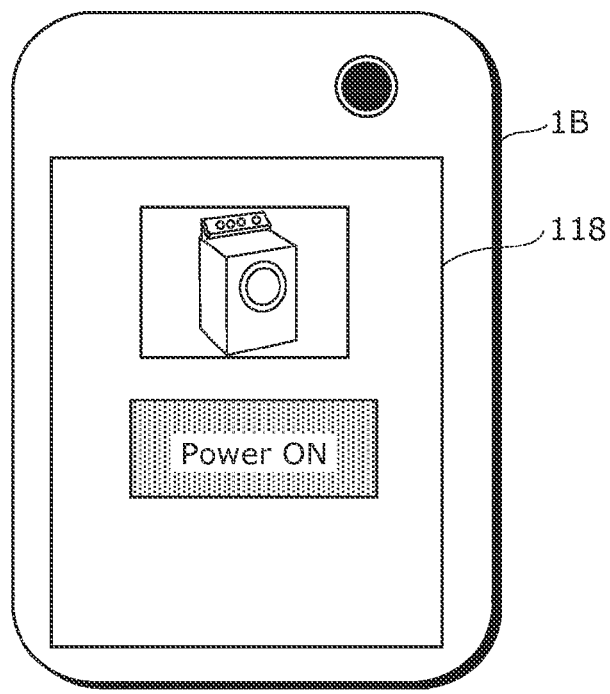
FIG. 24A is a diagram illustrating an example of a dialogue displayed on a display screen of an information terminal according to Embodiment 3.
Figure 24B:
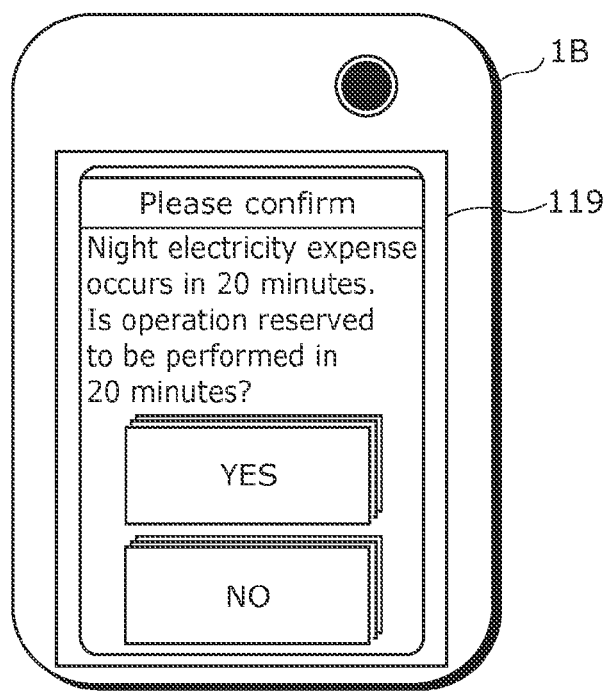
FIG. 24B is a diagram illustrating an example of a dialogue displayed on the display screen of the information terminal according to Embodiment 3.

More specifically, FIG. 24A illustrates a display screen 118 that displays an operation UI of a washing drying machine having an apparatus ID of "10". FIG. 24B illustrates a display screen 119 that displays a dialogue after the user presses a "Power ON" button on the display screen 118 in FIG. 24A. In the example of FIG. 24B, the user is recommended to reserve the selected control to save an electricity cost. This is because a time (operation time zone) in which the user selects the control menu for controlling the washing drying machine having the apparatus ID of "10" satisfies the condition "state flag" in the registered dialogue table illustrated in FIG. 22, and therefore the remote control application receives, as a reply, an importance "Notify" from the server 4.

It should be noted that the dialogue displayed on the display screen 119 is not limited to the above example. If there is a "state flag" indicating that an apparatus causing high electricity consumption is used in addition to the target apparatus, it is possible to present the user with the operation schedule as a dialogue. It is also possible that the registered dialogue table includes, as a "state flag", condition of a state or an age of an expendable item, such as wash powder for the washing drying machine or a lint trap.

Figure 25A:
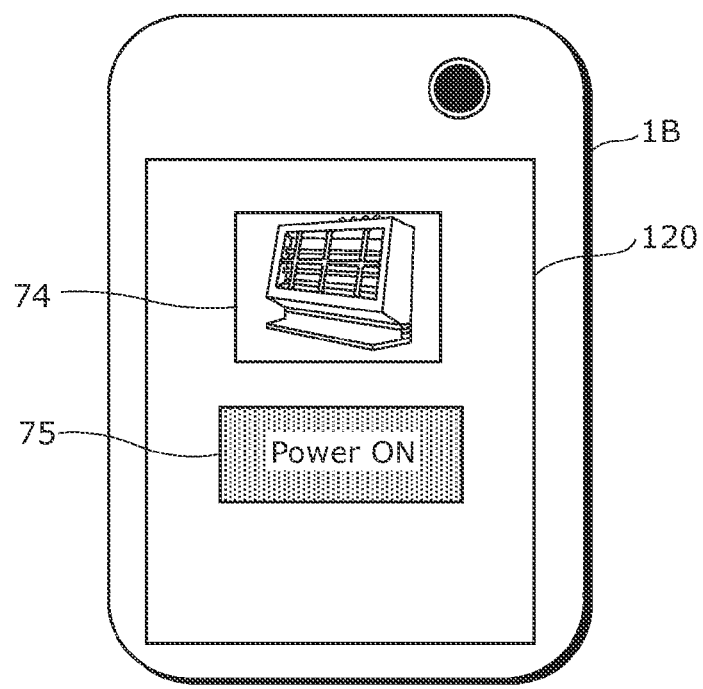
FIG. 25A is a diagram illustrating an example of a dialogue displayed on the display screen of the information terminal according to Embodiment 3.
Figure 25B:
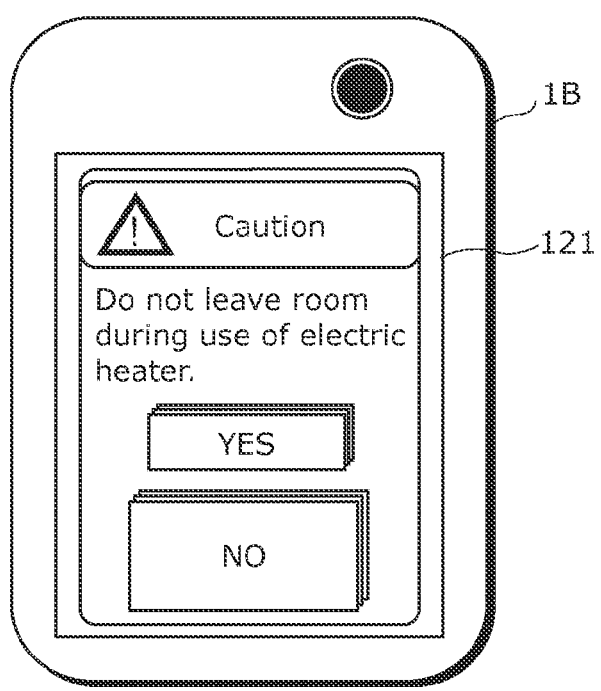
FIG. 25B is a diagram illustrating an example of a dialogue displayed on the display screen of the information terminal according to Embodiment 3.

FIG. 25A illustrates a display screen 120 that displays an operation UI of an electric heater having an apparatus ID of "11", FIG. 25B illustrates a display screen 121 that displays a dialogue after the user presses a "Power ON" button on the display screen 120 of FIG. 25A. In the example of FIG. 25B, a state of a target apparatus satisfies condition of a "state flag", and an importance "Important" is notified as a reply, so that the dialogue generated by the remote control application is displayed. In the display screen 121, an area of a "YES" button is reduced, while an area of a "NO" button is expanded. If the "NO" button is pressed, no control is performed on the target apparatus. As described above, the change of an area size of a button can catch user's notice in the dialogue display.

Figure 25C:
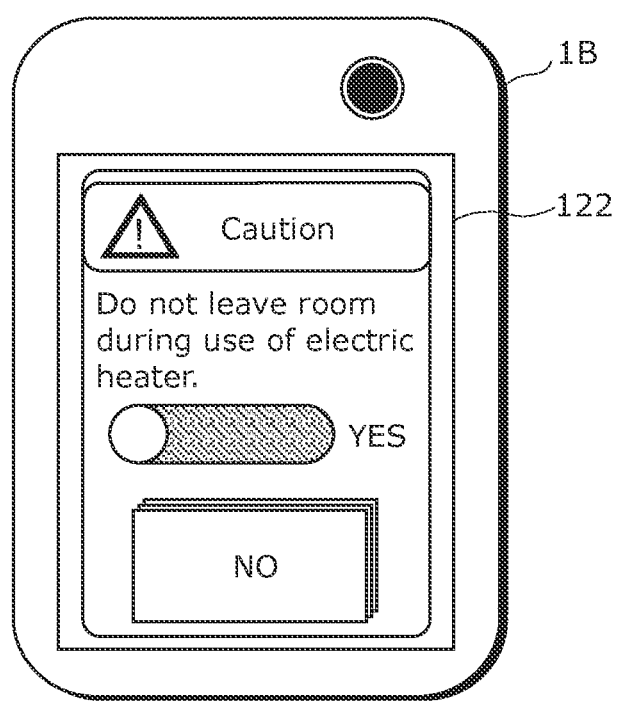
FIG. 25C is a diagram illustrating an example of a dialogue displayed on the display screen of the information terminal according to Embodiment 3.

It should be noted that the method of catching user's notice in dialogue display may be as illustrated in a display screen 122 of FIG. 25C. More specifically, it is also possible that a type of a "YES" button on the display screen 122 in FIG. 25C is changed from a pushing type to a sliding type to catch user's notice. The type of the "YES" button may be changed to a tapping type, such as a long pressing type or a double tapping type.

Figure 26A:
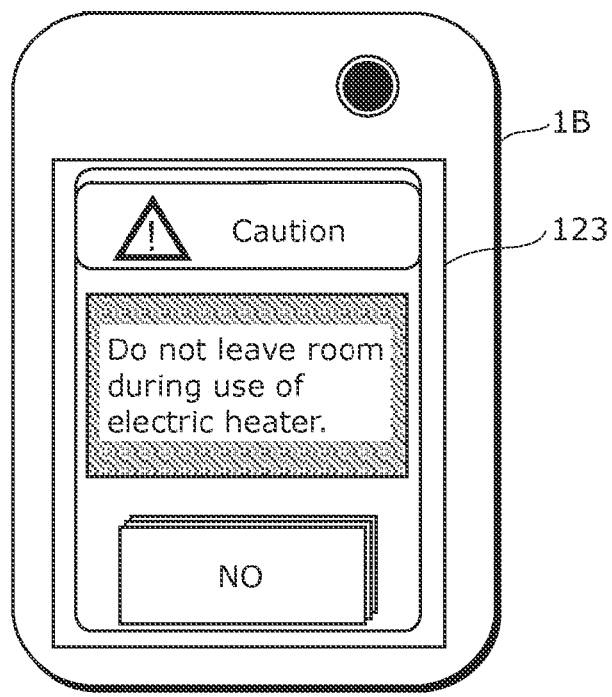
FIG. 26A is a diagram illustrating an example of a dialogue displayed on the display screen of the information terminal according to Embodiment 3.
Figure 26B:
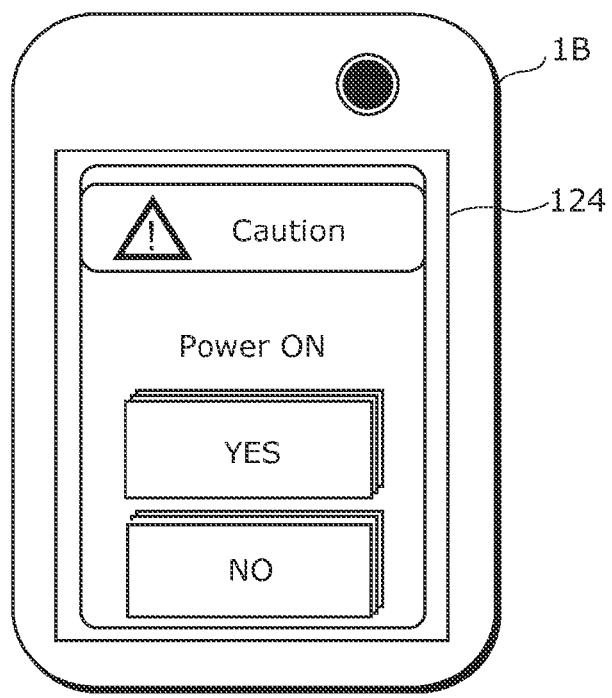
FIG. 26B is a diagram illustrating an example of a dialogue displayed on the display screen of the information terminal according to Embodiment 3.

The method of catching user's notice in dialogue display may be, as illustrated in FIG. 26A, displaying of a "message text" directly on a button in a display screen 123. When the user presses the button with the message text, a further dialogue may be displayed on a display screen 124 as illustrated in FIG. 26B. By increasing the number of selection actions on purpose, it is possible to catch user's notice.

Figure 27A:
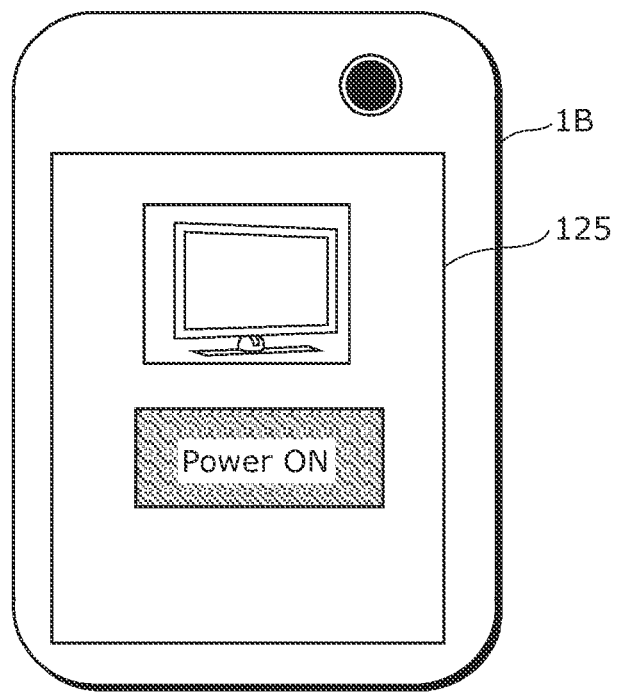
FIG. 27A is a diagram illustrating an example of a dialogue displayed on the display screen of the information terminal according to Embodiment 3.
Figure 27B:
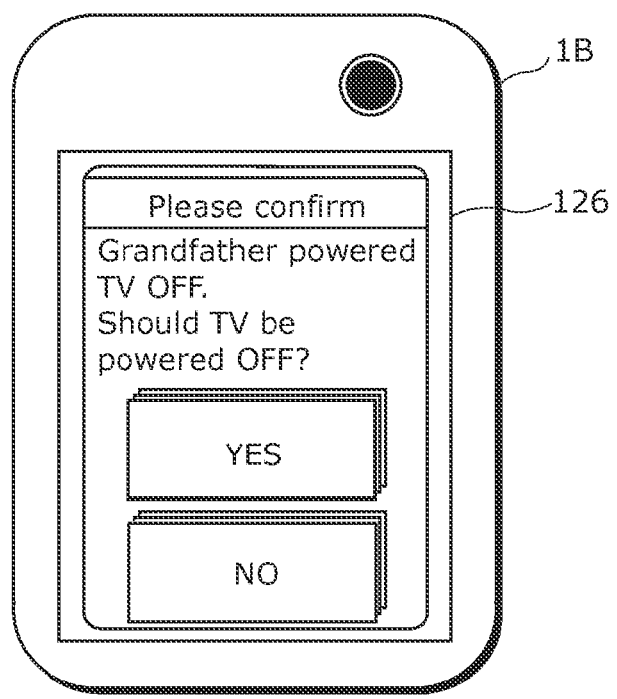
FIG. 27B is a diagram illustrating an example of a dialogue displayed on the display screen of the information terminal according to Embodiment 3.

FIG. 27A illustrates a display screen 125 that displays an operation UI of a TV having an apparatus ID of "12". FIG. 27B illustrates a display screen 126 that displays a dialogue after the user presses a "Power OFF" button on the display screen 125 of FIG. 27B. In FIG. 27B, the display screen 126 is displayed in the situation where a user who is specified as an "adult" according to the user information table illustrated in FIG. 8 is watching the TV (target apparatus) that is currently powered ON. More specifically, since the state of the TV satisfies the "state flag" in FIG. 22, the remote control application receives, as a reply, an importance "Notify". As a result, a dialogue indicating the notification on the display screen 126 of the information terminal 1B. In the example illustrated in FIG. 27B, it is learned, according to the user information table illustrated in FIG. 8, that a holder "Grandfather" has powered the TV ON. Therefore, it is possible to provide the user with different action selections, such as contacting the "Grandfather" or checking a current position.

Figure 28A:
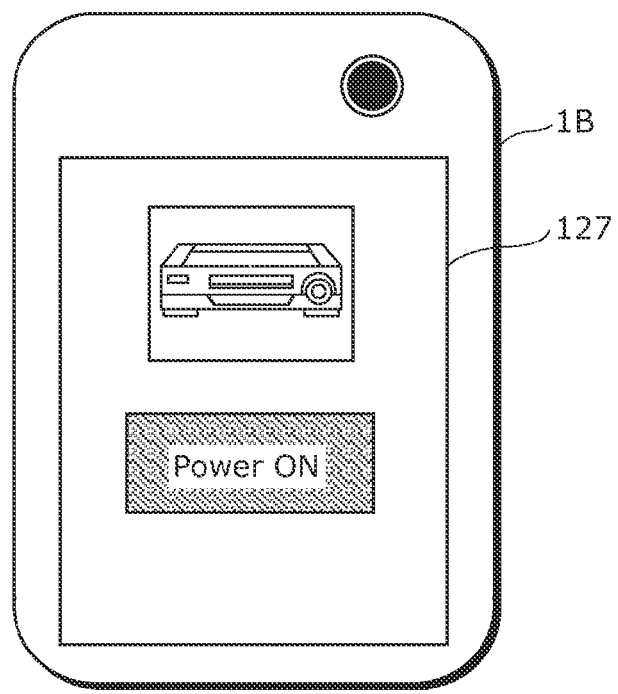
FIG. 28A is a diagram illustrating an example of a dialogue displayed on the display screen of the information terminal according to Embodiment 3.
Figure 28B:
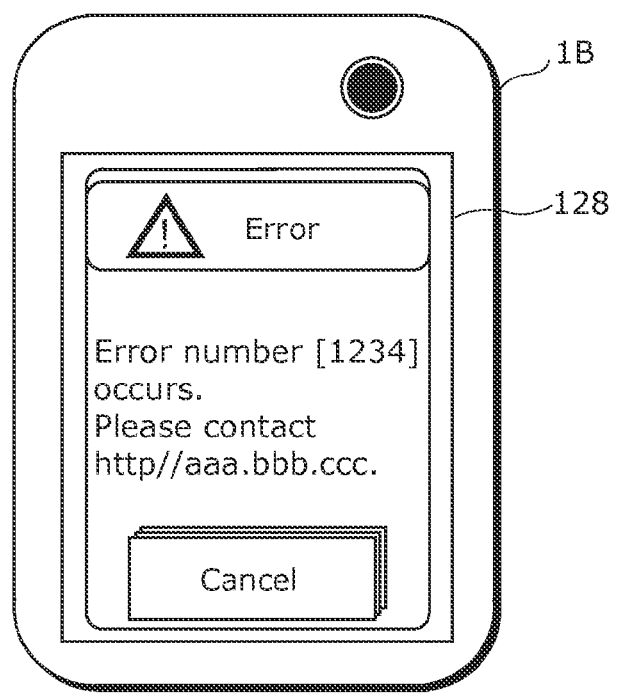
FIG. 28B is a diagram illustrating an example of a dialogue displayed on the display screen of the information terminal according to Embodiment 3.

Furthermore, as an example of providing the user with action selections, it is possible to perform dialogue display on a display screen 128 as illustrated in FIG. 28B. More specifically, it is possible that, on the display screen 127 in FIG. 28A, an operation UI of a recorder having an apparatus ID of "13" is displayed, and that if the user presses a "Power ON" button on the display screen 127 in FIG. 28A, a dialogue in a display screen 128 in FIG. 28B is displayed. In the example of the display screen 128 in FIG. 28B, a state of a target apparatus is included in (matches) the "state flag", and after the remote control application receives, as a reply, an importance "Error", a dialogue generated by the remote control application is displayed. In this example, a recorder has an error, and an error number and a Uniform Resource Identifier (URI) of contact address are presented to the user as a dialogue. Therefore, the user accesses the contact website, or temporarily cancels the operation on the recorder. The present invention is not limited to the above example regarding the importance "Error". It is also possible to merely notify the error to the user and automatically access the contact address.

3.4 Effects

As described above, according to Embodiment 3, it is possible to provide a control method capable of appropriately controlling a target apparatus by using an information terminal according to a situation of the target apparatus.

More specifically, by the control method according to Embodiment 3, for example, when an operator of an information terminal selects a first control menu for causing a target apparatus to perform an operation, a dialogue is displayed on the display unit of the information terminal according to a situation, such as a night power consumption time zone, weather, or a state of the target apparatus, before operation of the target apparatus. As a result, the dialogue display catches user's notice for an operation (control) that affects the user, so that the user can perform the control after checking whether or not the operation affects the user.

It should be noted that it has been described in Embodiment 3 that the functions of the target apparatus are "Power ON" and "Power OFF", but any other functions may be used. It should also be noted that it has been described in Embodiment 3 that there are two selections of "YES" and "NO", but the server may decide selections or button types in addition to a message text.

Embodiment 4

By using the remote control system according to any one of Embodiments 1 to 3, it is possible to perform remote operation (remote control) on a target apparatus. However, there is a situation where, when a person A performs remote control on a target apparatus, there is a different person B at the position of the target apparatus. In this case, there would be cases where the person B feels discomfort when the target apparatus in front of the person B is suddenly operated, or where the target apparatus currently operated by the person B is operated by the person A without any notice. In Embodiment 4, a control method in consideration of the above cases is described.

4.1 Overall Configuration of Remote Control System

The following describes a remote control system according to Embodiment 4 with reference to the Drawings.

Figure 29:
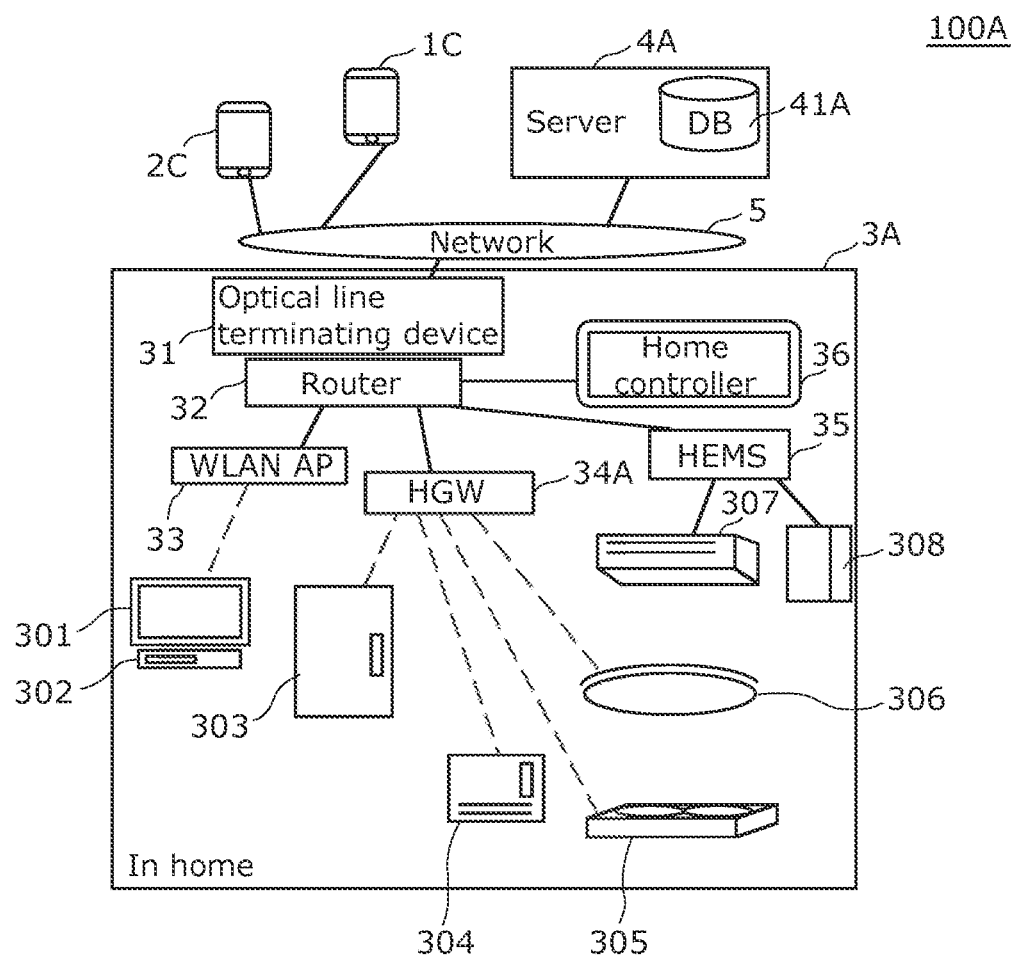
FIG. 29 is a diagram illustrating an overall configuration of a remote control system according to Embodiment 4.

FIG. 29 is a diagram illustrating an example of an overall configuration of the remote control system according to Embodiment 4. It should be noted that the same reference numerals in FIG. 1 are assigned to the identical elements in FIG. 29, so that details of the identical elements are not described again below.

The remote control system 100A in FIG. 29 differs from the remote control system 100 according to Embodiment 1 in that each of an information terminal 1C, an information terminal 2C, and a server 4A has a function different from a corresponding processing unit in the remote control system 100, and that there are sensors (not illustrated) in home 3A.

In a part of the rooms in the home 3A, there are sensors (not illustrated) for detecting whether or not someone is in the room. Such Tsensors are, for example, a human detection sensor using infrared light and a human recognition device using a camera.

An HGW 34A has a function of notifying a processing request provided from the server 4A to a target apparatus 300 in the home 3A, and notifying the server 4A of information obtained from the sensors and the target apparatus 300 or a result of the processing.

The home controller 36 has a function of serving as a remote controller that requests a target apparatus to perform processing (performs a processing request). While the home controller 36 is not provided with GPS, the home controller 36 has a terminal ID and notifies the server 4A of the terminal ID before performing the processing request, in the same manner as the information terminal 1C or the like.

4.2 Structure of Information Terminal

Figure 30:
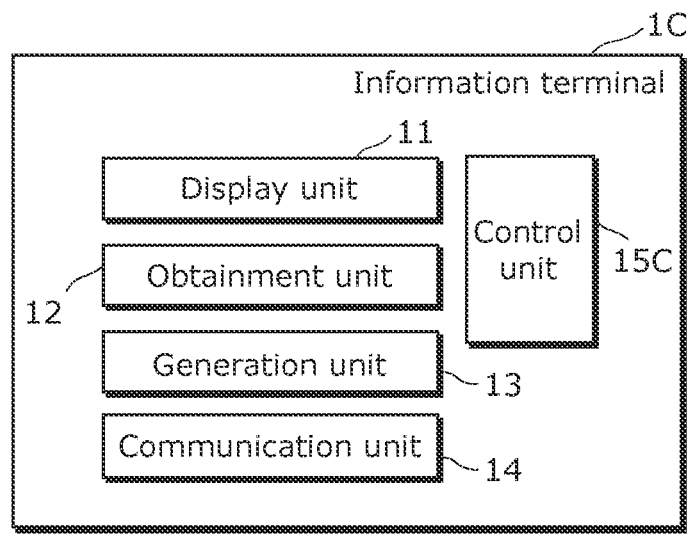
FIG. 30 is a block diagram illustrating an example of a structure of an information terminal according to Embodiment 4.

FIG. 30 is a block diagram illustrating an example of a structure of an information terminal according to Embodiment 4. It should be noted that the same reference numerals in FIGS. 2 and 11 are assigned to the identical elements in FIG. 30, so that details of the identical elements are not described again below.

Each of the information terminals 1C and 2C is, for example, a smartphone, and has a function of serving as a remote controller that requests a target apparatus 300 to perform processing. Each of the information terminals 1C and the like has a terminal TD. Each of the information terminals is capable of determining a current position of the information terminal by GPS, and has a function of transmitting the position information to the server 4A. When each of the information terminal 1C and the like issues a processing request to a target apparatus, it notifies the server 4A of the terminal ID and the current position information beforehand.

The information terminal 1C illustrated in FIG. 30 differs from the information terminal 1 according to Embodiment 1 in that a control unit 15C has a function different from the function of the control unit 15. The following describes the function of the control unit 15C.

The control unit 15C causes the display unit 11 of the information terminal 1C to display, on a user interface region (display screen) of the display unit 11, action type candidates associated with respective operations on a target apparatus 300. The action type candidates are candidates for an action type which the user wishes to take. Furthermore, the control unit 15C causes the display unit 11 of the information terminal 1C to display, on the user interface region, one or more control menus in a display mode determined based on the selected action type candidate and obtained control indexes.

In Embodiment 4, when one (first control menu) of the control menus displayed on the information terminal 1C is selected, the control unit 15C transmits, to the communication unit 14, a message for inquiring to a person, who is to be influenced by control corresponding to the first control menu, whether or not the person agrees with the control. Then, the control unit 15C may cause the generation unit 13 to generate a control signal after the person agrees with the control.

The above-described person is, for example, a person who is currently using an apparatus 300 that is a target apparatus to be operated according to the control corresponding to the first control menu. The person who is currently using the target apparatus 300 includes a person near the target apparatus 300 and a person who has previously controlled the target apparatus 300. The control corresponding to the first control menu may be control for changing a state of the target apparatus 300 or control for causing the target apparatus 300 to obtain information related to privacy of the person.

For example, when receiving a reply notifying that the above-described person does not agree with the control corresponding to the first control menu, the control unit 15C may cause the generation unit 13 not to generate a control signal for causing the target apparatus 300 to perform operation according to the control corresponding to the first control menu.

Furthermore, for example, if it is determined that the above-described person has not replied to the agreement inquiry over a predetermined time period, the control unit 15C may cause the generation unit 13 to generate the control signal for causing the target apparatus 300 to perform the operation according to the control corresponding to the first control menu.

Although it has been described that it is the control unit 15C that issues a message for making an agreement inquiry to a person who is influenced by the control corresponding to the first control menu, the present invention is not limited to the above. The server 4A may issue the message.

4.3 Structure of Server

Figure 31:
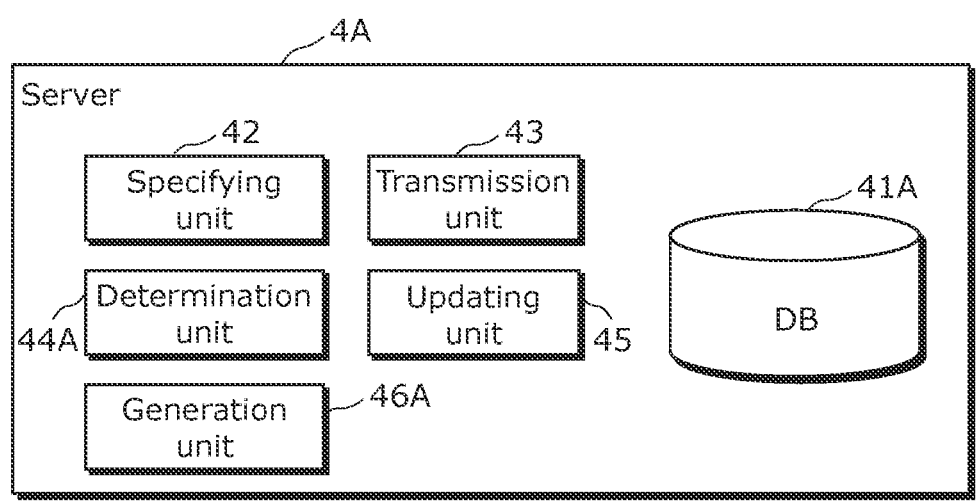
FIG. 31 is a block diagram illustrating an example of a structure of a server according to Embodiment 4.

FIG. 31 is a block diagram illustrating an example of a structure of the server according to Embodiment 4. It should be noted that the same reference numerals in FIG. 3 are assigned to the identical elements in FIG. 31, so that details of the identical elements are not described again below.

The server 4A receives a processing request from the information terminal 1C or the like, such as a smartphone, and performs processing requested in the processing request. The processing request is notified to the target apparatus via processing for inquiring the HGW 34A about information required to perform the processing request or via the HGW 34A.

The server 4A illustrated in FIG. 31 differs from the server 4 according to Embodiment 1 in that each of a DB 41A, a determination unit 44A, and a generation unit 46A has a function different from the function of the corresponding processing unit in the server 4.

In the DB 41A, a type, an apparatus ID, a function, a place (for example, a room name) and the like of each of the apparatuses are registered. Furthermore, in the DB 41A, information regarding family members in home having the apparatuses is also registered. Moreover, in the DB 41A, pieces of information regarding a current operation state of each apparatus, whether or not there is someone in each room, who is in the room if there is someone in the room, and the like are registered. These pieces of information are updated according to information provided from the HGW 34A.

The specifying unit 42 specifies a holder of the information terminal 1C (smartphone) or the like based on a terminal ID, when the specifying unit 42 receives a processing request from the information terminal 1C or the like.

The determination unit 44A determines, based on current position information of the operator of the information terminal 1C or the like and the registered position information of the home 3A, whether or not the information terminal 1C or the like is in the home 3A or outside the home 3A. Furthermore, with reference to the DB 41A, at the time of the determination, the determination unit 44A determines whether or not there is someone except the user in a room having the target apparatus or in a room near the target apparatus. Therefore, the server 4A is capable of providing an interface according to an attribute of the specified holder, a position of the information terminal 1C or the like, an attribute of the target apparatus, a function of the target apparatus, circumstances of the target apparatus, or the like.

When the generation unit 46A receives, from the information terminal 1C, a notification indicating that the first control menu is selected, the generation unit 46A generates a message for making an agreement inquiry to a person who is to be influenced by the control corresponding to the first control menu, and transmits the message to the target apparatus 300. In addition, the generation unit 46A generates display screen information indicating that an agreement to the control is currently being inquired, and transmits the display screen information to the information terminal 1C. It is also possible that the generation unit 46A transmits a control signal, which has been transmitted from the information terminal 1C and stored in the server 4A, to the target apparatus 300 after the person has agreed with the control.

As a result, for example, by the control signal transmitted from the information terminal 1C, it is possible to control a target apparatus from outside of the home. For example, it is possible to power OFF, from the outside of the home, a TV or an air conditioner which the user has forgotten to power OFF. Furthermore, if there is a person different from the operator of the information terminal 1C in a room having a target apparatus such as a TV or an air conditioner, the target apparatus produces agreement inquiry sound or agreement inquiry display to inquire the person in the room whether or not the person agrees with the control on the target apparatus. If the person in the room agrees with the control, the target apparatus is allowed to be operated according to the control. Furthermore, it is also possible to, before performing the operation indicated by the processing request, display information indicating whether or not the processing request requires an agreement inquiry to a different person, on the user interface region (display screen) of the display unit 11 of the information terminal 1C.

4.4 Operations of Remote Control System

The operation of the remote control system 100A having the above-described configuration is performed also according to the flowchart of FIG. 4. Embodiment 4 differs from Embodiment 1 in that the above-described agreement inquiry processing is performed after S7.

4.5 Example

Figure 32:
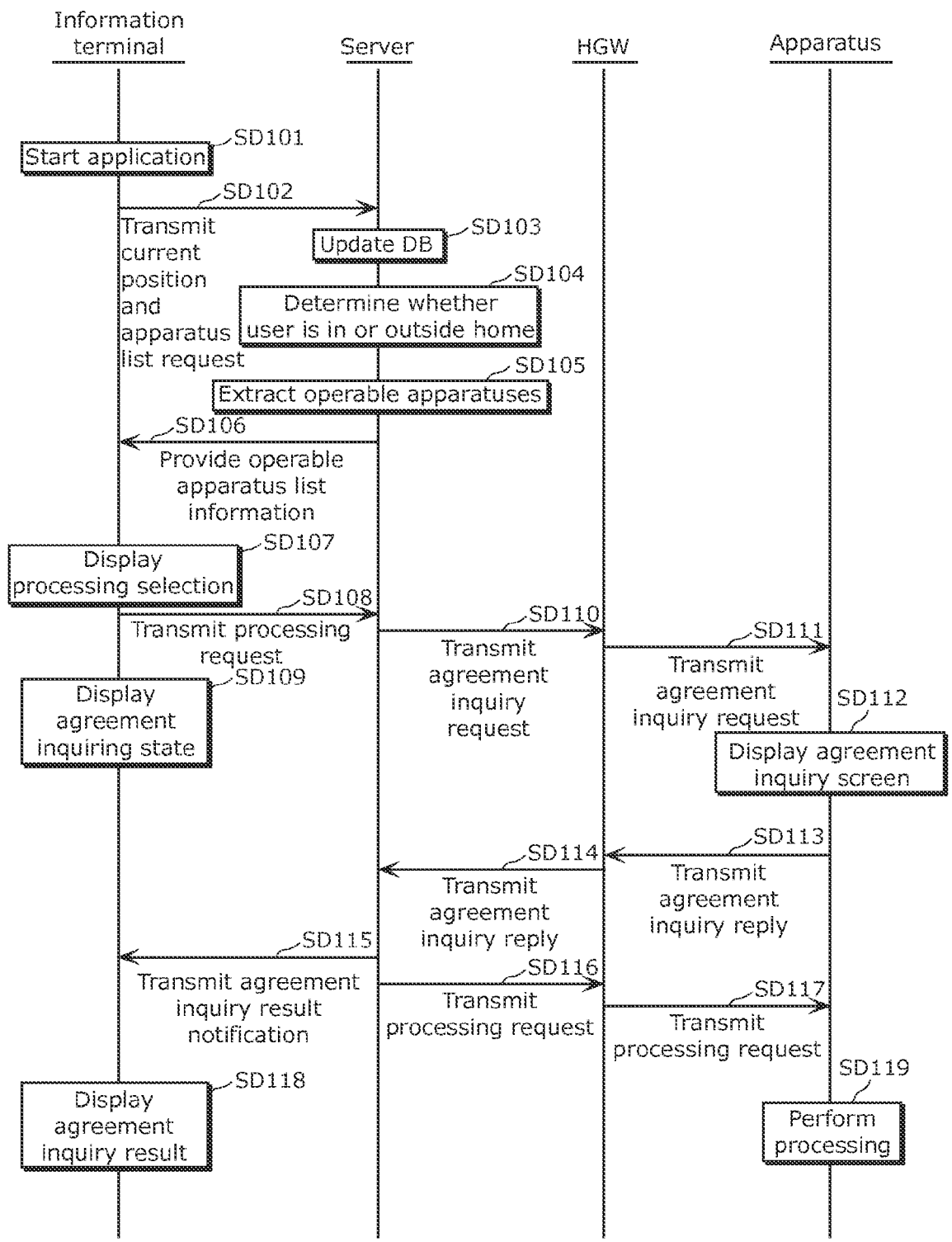
FIG. 32 is a time chart of an example of processing performed in a remote control system according to Example of Embodiment 4.

The following describes, as Example of Embodiment 4, an example of the remote control on a target apparatus by the remote control system 100A operating as above, with reference to a time chart illustrated in FIG. 32.

FIG. 32 is a time chart illustrating an example of processing performed by the remote control system according to Example of Embodiment 4.

Here, it is assumed that a function of the information terminal 1C (smartphone) for serving as a remote controller is provided by executing an application (remote control application) installed in the information terminal 1C. In Example of Embodiment 4, the description is given for the case where the target apparatus is a TV, and the TV is powered OFF by remote control.

First, an operator (hereinafter, referred to as a "user") of the smartphone (information terminal C1) starts the remote control application (SD101).

Next, the remote control application transmits a request for an apparatus list to the server 4A in starting of the remote control application or in re-starting of an operation, and transmits the terminal ID and current position information of the smartphone in the format as illustrated in, for example, FIG. 33A (SD102). Here, FIG. 33A is a diagram illustrating an example of information transmitted at SD102 according to Embodiment 4. More specifically, the remote control application transmits information indicating that a smartphone having a terminal ID of "01" is positioned at latitude 35.6776 north and latitude 139.7704 east at 02:45:41 on Dec. 24, 2012 in Japan Standard Time (current position information). It should be noted that the apparatus list refers to candidates for a target apparatus 300 among the apparatuses.

Next, the server 4A updates the DB 41A (SD103). More specifically, the server 4A updates the user information table illustrated in, for example, FIG. 33B, which is registered in the DB 41A, according to the information transmitted at SD102. Here, FIG. 33B is an example of the user information table registered in the server according to Example of Embodiment 4. If the terminal ID notified from the remote control application is "01", the server 4A can specify that the notified information terminal 1C is a smartphone and a holder of the smartphone is a "Father". It should be noted that SD103 is a step corresponding to the determination at S104 in FIG. 5.

Next, the server 4A performs in-home determination (SD104). More specifically, based on the current position information which is transmitted (notified) from the remote control application and the registered position information of the home, the server 4A determines whether or not the smartphone (information terminal 1C) that has issued a processing request is in the home 3A or outside the home 3A. For example, in the same manner as Embodiment 1, if a difference between the current position information of the smartphone and the position information of the home is within ±10 m, it is determined that the smartphone is in the home 3A. Otherwise, it is determined that the smartphone is outside the home 3A.

If it is impossible to obtain the positioning information or if the positioning information is obtained but has a low accuracy, it is possible to determine that the smartphone is outside the home. However, if it is certain based on various kinds of sensor information that the father is in the home, it is possible to determine that the smartphone is in the home. If the smartphone is connected to a wireless LAN in the home, it is possible to determine that the smartphone is in the home regardless of the positioning information. It should be noted that SD104 is a step corresponding to the determination at S105 in FIG. 5. In the following description according to Example of Embodiment 4, it is assumed that it is determined at SD104 that the smartphone is in the home.

Next, the server 4A performs operable apparatus extraction (SD105). More specifically, the server 4A searches an in-home apparatus table as illustrated in, for example, FIG. 34A, which is registered in the DB 41A, and extracts apparatuses operable in the home. Furthermore, the server 4A extracts information regarding a person near each apparatus based on the sensor information table as illustrated in, for example, FIG. 34B, which is registered in the DB 41A. FIG. 34A is an example of the in-home apparatus table registered in the server according to Example of Embodiment 4. FIG. 34B is an example of the sensor information table registered in the server according to Example of Embodiment 4.

The server 4A generates operable apparatus list information (display screen information) to be displayed by the remote control application of the smartphone, based on the information extracted from the tables illustrated in FIGS. 34A and 34B. For example, the server 4A generates a list of operable apparatuses in home, and possible operation list information as illustrated in FIG. 35, which includes a person near each apparatus (nearby person). The possible operation list information illustrated in FIG. 35 includes, for each of the apparatuses, a list of possible operations and information indicating which operation requires an agreement inquiry to a nearby person.

FIG. 35 is an example of possible operation list information provided as a reply from the server to the smartphone at SD106 according to Example of Embodiment 4. In FIG. 35, the asterisk (*) following a processing name in "possible processing" indicates that, if there is someone (nearby person) near a corresponding target apparatus, it is necessary to inquire the nearby person whether or not the person agrees with the control.

It should be noted that SD105 is a step corresponding to the display information generation at S109 in FIG. 5.

Next, the server 4A transmits, as a reply, the generated operable apparatus list information to the smartphone (SD106).

Figure 36:
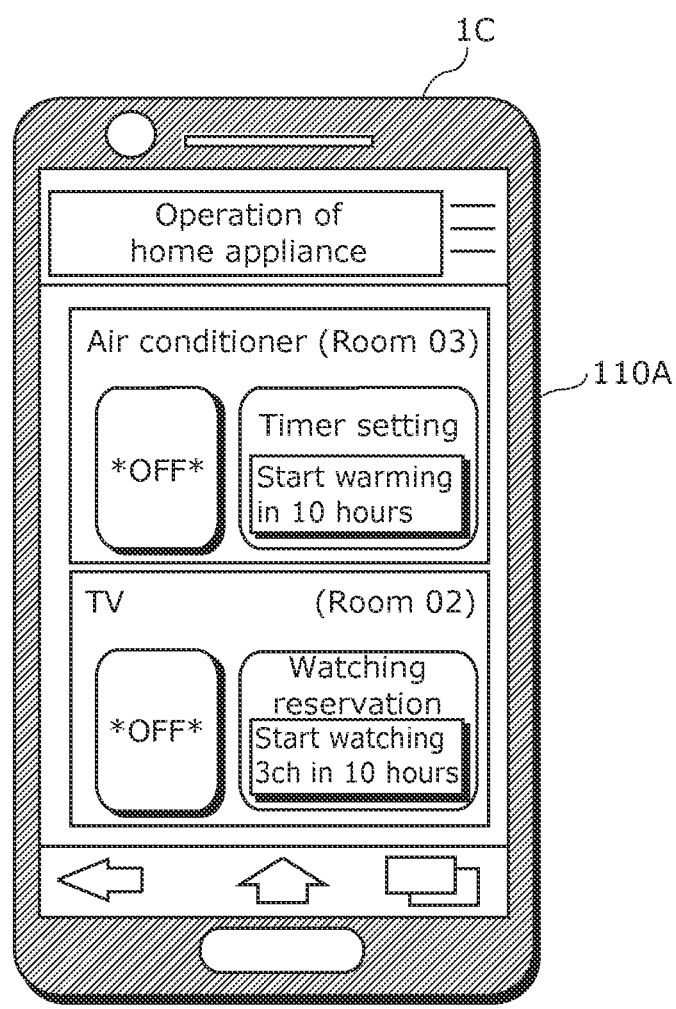
FIG. 36 is a diagram illustrating an example of a display screen of a smartphone according to Example of Embodiment 4.

Next, the smartphone performs processing selection display (SD107). More specifically, the smartphone receives the operable apparatus list information, and displays the target apparatus 300 and candidates for processing for the target apparatus 300 on a display screen 110A as illustrated in, for example, FIG. 36. FIG. 36 is a diagram illustrating an example of a display screen of the smartphone according to Example of Embodiment 4. In this example, a TV and an air conditioner are displayed as candidates for a target apparatus. Regarding the air conditioner, it is possible to power OFF and set a time, Regarding the TV, it is possible to power OFF and reserve watching. It should be noted that FIG. 36 illustrates an example where candidates for a target apparatus and control menus for each of the target apparatus candidates are displayed on a display screen 110A.

Then, the user of the smartphone taps (touch-inputs) a button displayed on the display screen 110A to instruct execution of processing corresponding to the button. It should be noted that SD107 corresponds to the UI display at S111 in FIG. 5. In the following description according to Example of Embodiment 4, following steps are described assuming that a button for powering the TV OFF is tapped.

Next, the remote control application of the smartphone transmits, to the server 4A, a control signal for instructing execution of the processing (SD108) and displays information indicating that an agreement to the processing is currently being inquired (SD109). In Example of Embodiment 4, the control signal indicates instruction of powering the TV OFF.

Figure 37A:
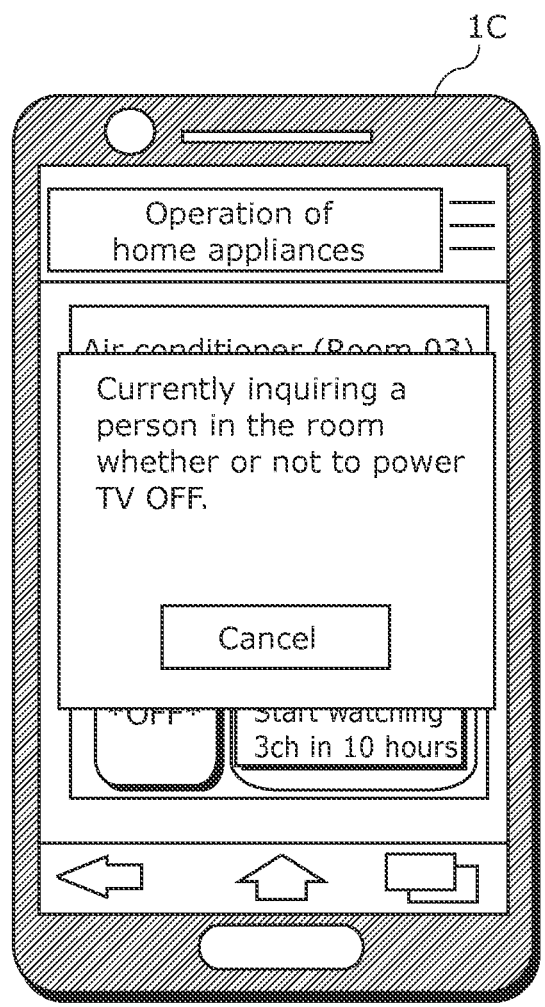
FIG. 37A is a diagram illustrating an example of a display screen of a smartphone according to Example of Embodiment 4.

More specifically, since the processing for powering the TV OFF requires an agreement inquiry to a person near the TV, the remote control application of the smartphone transmits, to the server 4A, a processing request for powering the TV OFF. Then, as illustrated in, for example, FIG. 37A, the remote control application displays a dialogue indicating that an agreement to the processing is currently being inquired to the nearby person, in order to notify the user of the smartphone of the agreement inquiring state. FIG. 37A is a diagram illustrating an example of a display screen of the smartphone according to Example of Embodiment 4. FIG. 37A illustrates an example of a display screen on which the dialogue is displayed.

Figure 37B:
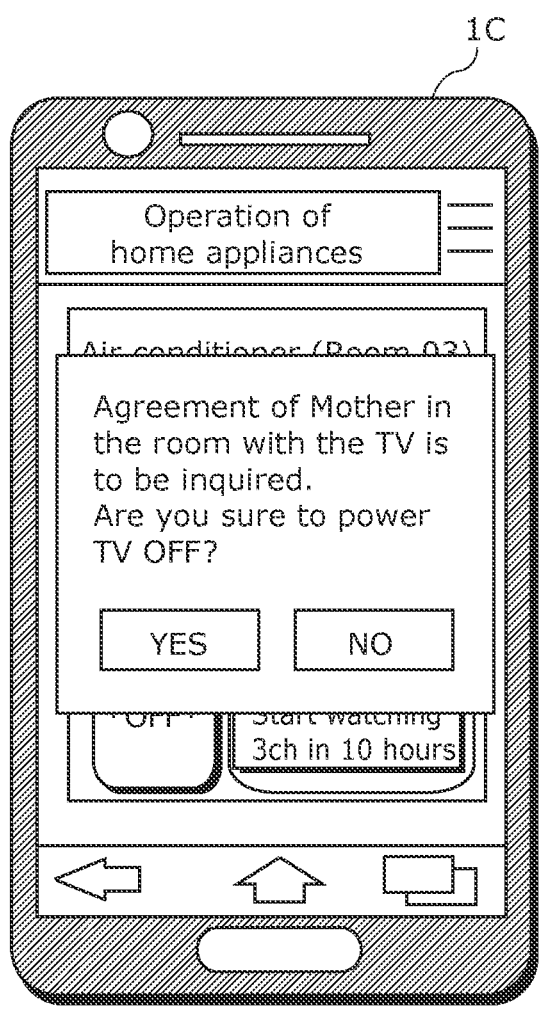
FIG. 37B is a diagram illustrating an example of a display screen of a smartphone according to Example of Embodiment 4.

It should be noted that it is possible that, before transmitting the processing request at SD108, as illustrated in for example, FIG. 37B, the user is notified that it is necessary to make an agreement inquiry to the nearby person, and then a dialogue for confirming the user whether or not to transmit the processing request is displayed. FIG. 37B is a diagram illustrating an example of a display screen of the smartphone according to Example of Embodiment 4. FIG. 37B illustrates a confirmation dialogue that is displayed immediately before transmitting a processing request. In FIG. 37B, it is already known who is in a room having the TV, based on "nearby person information" in the operable apparatus list information illustrated in FIG. 35. Therefore, a name of the person is also displayed on the dialogue. As a result, if the person near the TV seems very busy or in a bad temper, the user can decide not to request the processing that causes troubles.

Figure 37C:
FIG. 37C is a diagram illustrating an example of a display screen of a smartphone according to Example of Embodiment 4.

Furthermore, if information indicating that an agreement is currently being inquired is displayed at SD109, the display is not limited to the example of the display screen illustrated in FIG. 37A. For example, if the operation (control) requested by the user is not powering the TV OFF but reserving watching of the TV, an agreement by the nearby person is not necessary. Therefore, as illustrated in, for example, FIG. 37C, it is possible to merely output a dialogue on the display screen. FIG. 37C is a diagram illustrating an example of the display screen of the smartphone according to Example of Embodiment 4.

Next, the server 4A transmits a request for an agreement inquiry (SD110 and SD111). More specifically, the server 4A receives the processing request for powering the TV OFF, but an agreement of the nearby person for the processing is necessary. Therefore, in order to make the agreement inquiry, a request for an agreement inquiry (agreement inquiry request) is transmitted to the TV that is a target apparatus indicated in the processing request. The request for an agreement inquiry includes instruction for displaying a result of the agreement inquiry to the user. This agreement inquiry request is transmitted to the TV as the target apparatus via the HGW 34A.

Figure 38:
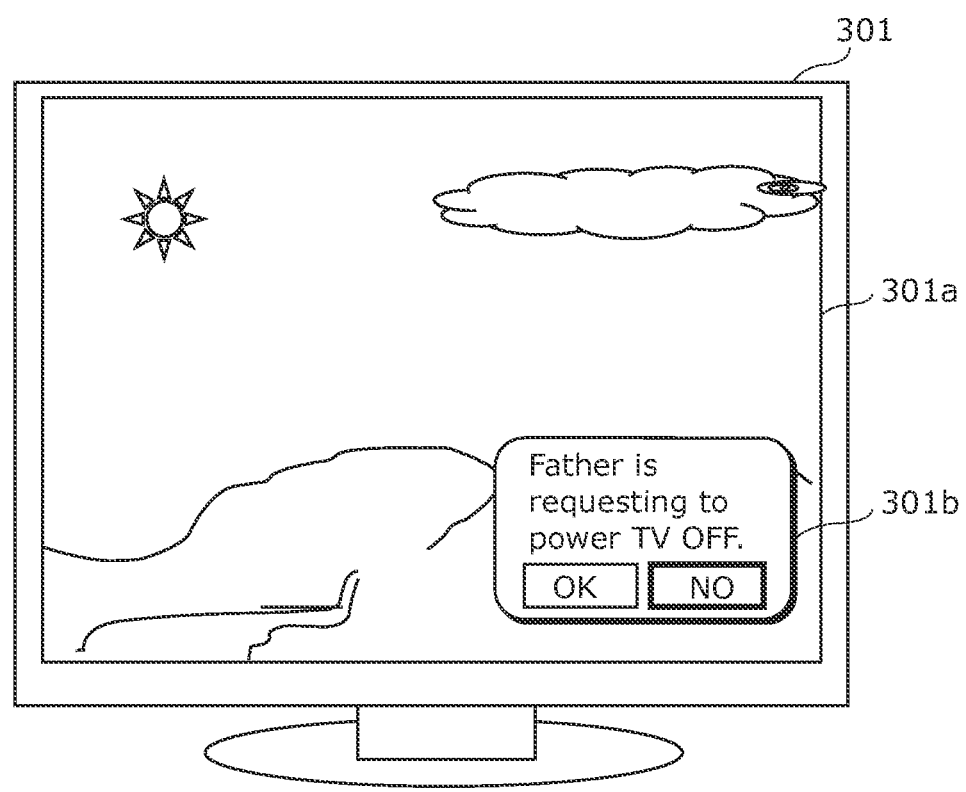
FIG. 38 is an example of a screen of a TV displaying an agreement inquiry message according to Example of Embodiment 4.

Next, when receiving the agreement inquiry request, the TV displays an agreement inquiry screen (SD112). More specifically, as illustrated in, for example, FIG. 38, the TV 301, which has received the agreement inquiry request, displays an agreement inquiry message 301b for inquiring the nearby person whether or not the nearby person agrees with the processing requested in the processing request. The agreement inquiry message 301b overlaps a screen 301a of the TV which the nearby person is currently watching. FIG. 38 is an example of the screen of the TV displaying the agreement inquiry message according to Example of Embodiment 4.

It should be noted that it has been described in Example of Embodiment 4 that the agreement inquiry request is transmitted to the TV 301, but the present invention is not limited to this example. For example, if the nearby person is identified and an information terminal, such as a smartphone, which the identified nearby person always holds is specified, it is also possible to transmit the agreement inquiry request to the smartphone owned by the nearby person. It is further possible to make an agreement inquiry to a nearby person of a target apparatus, by using a device rather than the target apparatus as long as the device is in a room having the target apparatus and is capable of issuing an agreement inquiry request to the nearby person.

Next, the TV as the target apparatus transmits a reply to the agreement inquiry, to the server 4A (SD113 and SD114). More specifically, first, a person near the TV (mother in this example) sees the agreement inquiry display on the TV, and replies to the agreement inquiry (operation for selecting "NO" or "OK") by using a TV remote controller or her smartphone. The following description is given for the case where "OK" is selected. If "OK" is selected, the TV transmits the reply (agreement inquiry reply) to the server 4A via the HGW 34A. The agreement inquiry reply indicates that a result of the agreement inquiry is OK (the nearby person agrees with the control).

Next, the server 4A, which has received the result of the agreement inquiry request, transmits, to the smartphone that first issues the processing request, agreement inquiry result notification indicating that the nearby person agrees with the control (SD115), and transmits the processing request for requesting the TV as the target apparatus to be powered OFF, to the TV via the HGW 34A (SD116 and SD117).

Figure 39A:
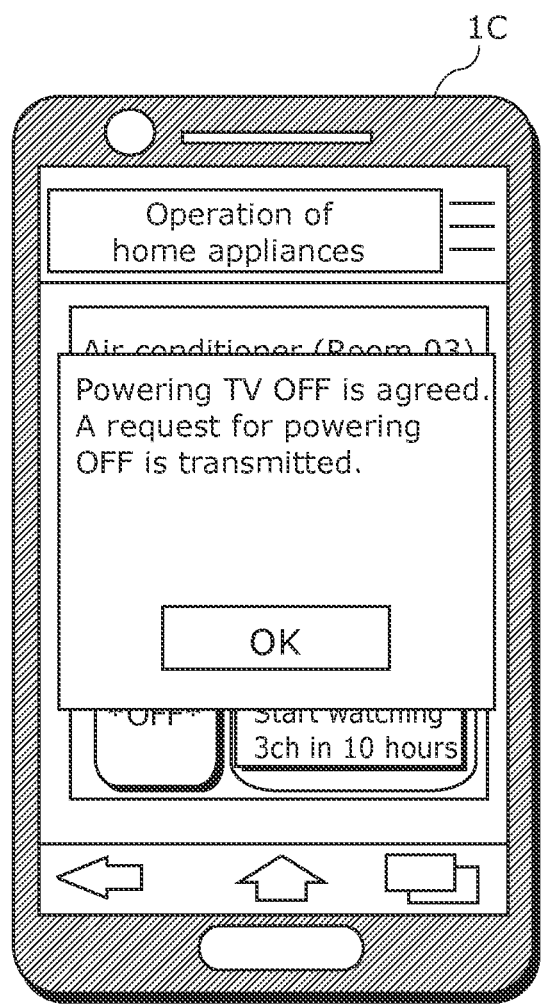
FIG. 39A is a diagram illustrating an example of a display screen of a smartphone displaying an agreement inquiry result according to Example of Embodiment 4.
Figure 39B:
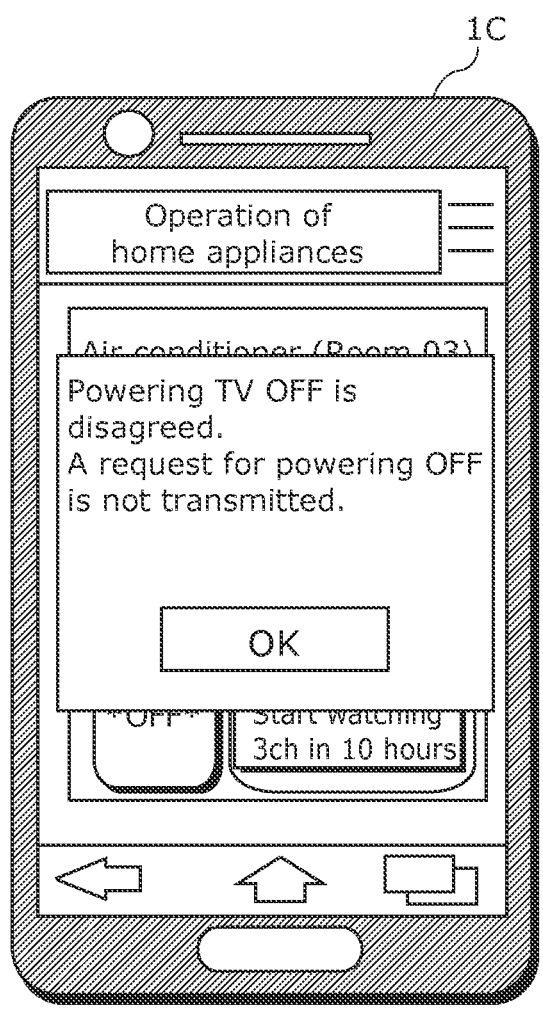
FIG. 39B is a diagram illustrating an example of a display screen of a smartphone displaying an agreement inquiry result according to Example of Embodiment 4.

Next, the smartphone displays the result of the agreement inquiry (SD118). More specifically, the smartphone receives the processing request result, and, according to the received result, displays an agreement inquiry result to the user on a display screen as illustrated in, for example, FIG. 39A or 39B. Each of FIGS. 39A and 39B is a diagram illustrating an example of a display screen of the smartphone displaying an agreement inquiry result according to Example of Embodiment 4. FIG. 39A illustrates the situation where an example of a dialogue (agreement inquiry result) when an OK result (agreement) is received in response to the agreement inquiry request. FIG. 39B illustrates the situation where an example of a dialogue (agreement inquiry result) when an NG result (disagreement) is received in response to the agreement inquiry request.

Next, the TV receives the processing request from the server 4A, and performs the requested processing by reserving watching or powering the TV OFF (SD119).

It should be noted that, if the operation (control) which the user requests at SD107 is watching reservation not powering OFF, an agreement inquiry to the nearby person is not necessary. Therefore, the server 4A may transmit the processing request to the TV without transmitting an agreement inquiry request, and proceed to SD119.

4.6 Effects

As described above, according to Embodiment 4, it is possible to provide a control method capable of appropriately controlling a target apparatus by using an information terminal according to a situation of the target apparatus.

More specifically, by the control method according to Embodiment 4, the user can control a target apparatus from the outside home. Furthermore, if there is a person different from the operator of the information terminal in a room having a target apparatus such as a TV or an air conditioner, the target apparatus produces agreement inquiry sound or agreement inquiry display to inquire the person in the room whether or not the person agrees with the control on the target apparatus. If the person in the room agrees with the control, the target apparatus is allowed to be operated according to the control. Furthermore, it is also possible to display, on the display unit (display screen) of the information terminal, whether or not the processing request requires an agreement inquiry to a different person, before issuing the processing request. As a result, it is possible to prevent that a different person feels discomfort when an apparatus in front of the different person is suddenly operated, or that an apparatus currently operated by a different person is operated by an operator of an information terminal without any notice.

(Variation 1)

It should be noted that it has been described in Embodiment 4 that it is determined, for each processing on each apparatus, whether or not an agreement inquiry is necessary, merely when performing remote control, but the present invention is not limited to the example.

For example, it is also possible to determine whether or not remote control requires an agreement inquiry to a nearby person, in more detail according to a position of the user performing a processing request.

FIG. 40 is an example of an apparatus database stored in a server to determine whether or not an agreement inquiry is necessary. Here, "A" in the table indicates that remote control is possible without an agreement inquiry, "B" in the table indicates that, if there is someone near a target apparatus, it is necessary to make an agreement inquiry to the person, "C" in the table indicates that an agreement inquiry is necessary if there is no one near a target apparatus but someone in home, and the target apparatus is not allowed to be operated if there is no one in home.

The "A", "B", and "C" are determined previously by a manufacturer of a target apparatus according to processing characteristics of the apparatus. More specifically, regarding an air conditioner, if the air conditioner is powered ON from the outside home, there is a risk of causing fire in the worst case when there is no one in home. Therefore, the remote operation is set to always require an agreement inquiry to a person in the home. Furthermore, regarding powering OFF or operation change, if remote control is performed without making an agreement inquiry to a person in a room where a target apparatus is located, there is a possibility that the person feels uncomfortable. Therefore, the remote control is set to always require an agreement inquiry to the person. On the other hand, timer setting or the like is considered to have a low possibility of influencing a person in a room where a target apparatus is located at the time of the operation. Therefore, such an operation is set to be performed without an agreement inquiry to the person.

It should be noted that it has been described in Variation 1 that whether or not an agreement inquiry to a nearby person is necessary is determined based on a risk of causing fire. However, for some kinds of remote control, it is possible to set, based on noise, smell, or privacy invasion, whether or not to make an agreement inquiry.

(Variation 2)

It should be noted that it has been describe in Embodiment 4 that an agreement inquiry to a nearby person is performed always in remote operation, but the present invention is not limited to the above. Depending on a processing request, it is possible that an agreement is inquired not to a person near a target apparatus at the time of the processing request, but to a person, such as an owner of the target apparatus or a head of family, who has authority of operating the target apparatus in home.

(Variation 3)

It should also be noted that it has been described in Embodiment 4 that an agreement inquiry is performed for preventing that a person near a target apparatus feels uncomfortable in remote control of the target apparatus, but the present invention is not limited to the above.

Depending on a processing request of remote operation, if the remote operation influences a schedule of a different person in the same home, it is possible to make an agreement inquiry to a person who causes the influence. For example, if a server holds data regarding a schedule indicating that an eldest daughter reserves watching of a TV, and someone requests competing watching reservation by remote operation, the server may make an agreement inquiry to a smartphone of the eldest daughter. Thereby, it is possible to prevent, for example, that reservation set by a person is unexpectedly overwritten by a different person in the same home.

(Variation 4)

It should also be noted that has been described in Embodiment 4 that target apparatuses to be remote-controlled are an air conditioner and a TV, but the target apparatuses may be any other home appliances, such as a recorder, a water heater, an electric fan, a refrigerator, a microwave, and a washing machine, or housing devices, such as a key to a front door and an electric window. Furthermore, the agreement inquiry screen is not necessarily displayed in the same mode when a processing request is issued. It is also possible to change a display mode or display details according to a degree of risk caused by remote control. It is desirable to present an agreement inquiry display or the like in a mode for more clearly informing a high risk or high importance, in particular, when an operation is performed on an apparatus, such as a range, a kotatsu (Japanese heater), or a stove, which has a risk of causing fire or incomplete combustion, when an operation is performed on an apparatus, such as a washing machine or a humidifier, which has a risk of causing water leakage, or when an operation is performed on an apparatus, such as an electric fan, a ventilating fan, or an electric shutter, which has exposed mechanic parts having a risk of injuries.

Although the control method used in the remote control system according to the aspect of the present invention has been described based on the embodiments, the present invention is not limited to the embodiment. Those skilled in the art will be readily appreciated that various modifications of the embodiments and various combinations of the constituent elements in different examples and variations are possible without materially departing from the novel teachings and advantages of the present invention. Accordingly, all such modifications and combinations are intended to be included within the scope of the present invention.

It should be noted that, in the above-described embodiments, each of the constituent elements may be implemented into a dedicated hardware or implemented by executing a software program suitable for the constituent element. Each of the constituent elements may be implemented when a program execution unit such as a Central Processing Unit (CPU) or a processor reads a software program recorded on a recording medium such as a hard disk or a semiconductor memory and executes the readout software program.

INDUSTRIAL APPLICABILITY

The present invention can be used in a control method of a remote control system, and used also in a control method using a mobile information terminal or the like having an integrated remote control UI or a remote control function for cooperating with home appliances.

REFERENCE SIGNS LIST 1, 1A, 1B, 1C, 2, 2C information terminal
3, 3A home
4, 4A server
5 network
11 display unit
12 obtainment unit
13 generation unit
14 communication unit
15, 15A, 15B, 15C control unit
16, 16B memory
31 optical line terminating device
32 router
35 north latitude
36 home controller
42 specifying unit
43 transmission unit
44, 44A determination unit
45 updating unit
46, 46A generation unit
52, 53, 63 icon
61, 62 item button
100, 100A remote control system
110, 110A, 111, 112, 113, 114, 115, 116, 117, 118, 119, 120, 121, 122, 123, 124, 125, 126, 127, 128 display screen 300 apparatus
301 TV
301a screen
301b agreement inquiry message
302 recorder
303 door intercom
304 heating appliance
305 cooking heater
306 lighting device
307 air conditioner
308 water heater
521 power OFF button
522 power ON button

The invention claimed is:

1. A control method used in a remote control system including a plurality of apparatuses and an information terminal that controls at least one of the apparatuses as a target apparatus via a network, the control method comprising:
  displaying target apparatus candidates or action type candidates on a user interface region of a display unit of the information terminal, the target apparatus candidates being candidates for the target apparatus among the apparatuses, and the action type candidates being candidates for a target action type which a user wishes to take and being associated with respective operations on the target apparatus;
  obtaining, via the network, a plurality of control indexes used to determine a display mode for the user interface region of the display unit of the information terminal;
  displaying, on the user interface region of the display unit of the information terminal, one or more control menus in the display mode determined based on (i) the target apparatus or the target action type and (ii) the control indexes, the target apparatus being selected from the target apparatus candidates, and the target action type being selected from the action type candidates;
  generating a control signal for causing the target apparatus to perform an operation according to control corresponding to a control menu, when the control menu is selected from the one or more control menus displayed on the user interface region of the display unit of the information terminal; and
  transmitting the control signal to the target apparatus via the network,
  wherein the control indexes include an attribute of an operator of the information terminal and a state of the target apparatus,
  in the displaying of the one or more control menus, when (i) the target apparatus has a heating function and (ii) the operator of the information terminal is a child, the one or more control menus displayed on the user interface region of the display unit of the information terminal include a predetermined control menu that is not selectable, the predetermined control menu being selectable when the operator of the information terminal is an adult,
  the predetermined control menu is for powering the target apparatus ON, and
  in the displaying of the one or more control menus, only a control menu for powering the target apparatus OFF is displayed on the user interface region of the display unit of the information terminal as the one or more control menus, and the control menu for powering the target apparatus ON is not displayed on the user interface region.

2. A control method used in a remote control system including a plurality of apparatuses and an information terminal that controls at least one of the apparatuses as a target apparatus via a network, the control method comprising:
  displaying target apparatus candidates or action type candidates on a user interface region of a display unit of the information terminal, the target apparatus candidates being candidates for the target apparatus among the apparatuses, and the action type candidates being candidates for a target action type which a user wishes to take and being associated with respective operations on the target apparatus;
  obtaining, via the network, a plurality of control indexes used to determine a display mode for the user interface region of the display unit of the information terminal;
  displaying, on the user interface region of the display unit of the information terminal, one or more control menus in the display mode determined based on (i) the target apparatus or the target action type and (ii) the control indexes, the target apparatus being selected from the target apparatus candidates, and the target action type being selected from the action type candidates;
  generating a control signal for causing the target apparatus to perform an operation according to control corresponding to a control menu, when the control menu is selected from the one or more control menus displayed on the user interface region of the display unit of the information terminal; and
  transmitting the control signal to the target apparatus via the network,
  wherein the control indexes include: an attribute of an operator of the information terminal; a current position of the operator of the information terminal; an attribute of a different operator of an information terminal different from the information terminal; and a current position of the different operator, and
  in the displaying of the one or more control menus, when (i) the target apparatus has a heating function, (ii) the operator of the information terminal is a child, (iii) the different operator of the different information terminal is near the current position of the operator of the information terminal, and (iv) the different operator of the different information terminal is an adult, the one or more control menus displayed on the user interface region of the display unit of the information terminal are same as the one or more control menus displayed when the operator of the information terminal is an adult.

3. The control method according to claim 1,
  wherein the control indexes further include a current position of an operator of the information terminal, and
  in the displaying of the one or more control menus, when the target apparatus has a heating function, the display mode is determined according to whether the current position is outside or inside of a home in which the target apparatus is located.

4. The control method according to claim 2,
  wherein the control indexes further include a state of the target apparatus,
  in the displaying of the one or more control menus, when (i) the target apparatus has a heating function and (ii) the operator of the information terminal is a child, the one or more control menus displayed on the user interface region of the display unit of the information terminal include a predetermined control menu that is not selectable, the predetermined control menu being selectable when the operator of the information terminal is an adult.

5. The control method according to claim 1,
wherein the control indexes further include a current position of an operator of the information terminal, and
in the displaying of the one or more control menus, when (i) the target apparatus has a heating function, (ii) the operator of the information terminal is a child, and (iii) the current position is in a home in which the target apparatus is located, the one or more control menus displayed on the user interface region of the display unit of the information terminal are identical to the one or more control menus displayed when the operator of the information terminal is an adult.

6. The control method according to claim 1,
wherein when the action type candidates are displayed and the target action type is selected by an operator of the information terminal from the action type candidates, the displaying of the target apparatus candidates or the action type candidates includes determining whether or not an operation on the target apparatus which is associated with the target action type satisfies a warning condition for issuing a warning to the operator of the information terminal, and
in the displaying of the one or more control menus, when it is determined in the determining that the operation satisfies the warning condition, the warning is displayed together with or superimposing on the one or more control menus on the user interface region of the display unit of the information terminal.

7. The control method according to claim 6,
wherein in the determining of whether or not the operation satisfies the warning condition, when the target action type is selected by the operator of the information terminal from the action type candidates, it is determined whether or not the operation on the target apparatus which is associated with the target action type satisfies a warning condition that the operation invades privacy of a person who is not the operator of the information terminal.

8. The control method according to claim 6,
wherein in the determining of whether or not the operation satisfies the warning condition, when the target action type is selected by the operator of the information terminal from the action type candidates, it is determined whether or not the operation on the target apparatus which is associated with the target action type satisfies a warning condition that the operation is an irreversible operation.

9. The control method according to claim 8,
wherein in the determining of whether or not the operation satisfies the warning condition, when (i) the target apparatus associated with the target action type is a video recorder and (ii) the operation on the target apparatus which is associated with the target action type is deletion of recorded content, it is determined that the operation on the target apparatus is the irreversible operation and satisfies the warning condition.

10. The control method according to claim 1, further comprising
displaying a dialogue for inducing an operator of the information terminal to determine whether or not the target apparatus is to operate according to control corresponding to a control menu, when the control menu is selected from the one or more control menus displayed on the information terminal,
wherein the generating of the control signal is performed when the operator of the information terminal determines, in the displaying of the dialogue, that the target apparatus is to perform the operation according to the control corresponding to the control menu.

11. The control method according to claim 1, further comprising
displaying a dialogue for inducing an operator of the information terminal to confirm control information related to control corresponding to a control menu, when the control menu is selected from the one or more control menus displayed on the information terminal,
wherein the generating of the control signal is performed when the operator of the information terminal confirms the control information in the displaying of the dialogue.

12. The control method according to claim 1, further comprising
displaying a message for inquiring a person whether or not the person agrees with control corresponding to a control menu, when the control menu is selected from the one or more control menus displayed on the information terminal, the person being to be influenced by the control,
wherein the generating of the control signal is performed after the person agrees with the control in the displaying of the message.

13. The control method according to claim 12,
wherein the person is using the target apparatus to perform the operation according to the control corresponding to the control menu.

14. The control method according to claim 13,
wherein the person using the target apparatus is one of (a) a person who is near the target apparatus and (b) a person who has controlled on the target apparatus, and
the control corresponding to the control menu is one of (a) control for changing a state of the target apparatus and (b) control for causing the target apparatus to obtain information regarding privacy of the person.

15. The control method according to claim 12,
wherein in the displaying of the message, the message is displayed on a display apparatus different from the target apparatus.

16. The control method according to claim 12,
wherein in the generating of the control signal, the control signal for causing the target apparatus to perform an operation according to control corresponding to the control menu is not generated when the person disagrees with the control in the displaying of the message.

17. The control method according to claim 12,
wherein in the generating of the control signal, the control signal for causing the target apparatus to perform an operation according to control corresponding to the control menu is generated when the person has not replied to the inquiring over a predetermined time period in the displaying of the message.

* * * * *